US010718123B2

(12) United States Patent
Ubiñana Felix

(10) Patent No.: US 10,718,123 B2
(45) Date of Patent: Jul. 21, 2020

(54) DEVICE FOR DISMOUNTABLY CONNECTING TWO INTERSECTING FORMWORK BEAMS

(71) Applicant: SISTEMAS TECNICOS DE ENCOFRADOS, S.A., Parets del Valles (Barcelona) (ES)

(72) Inventor: Jose Luis Ubiñana Felix, Parets del Valles (ES)

(73) Assignee: SISTEMAS TECNICOS DE ENCOFRADOS, S.A., Parets del Valles (Barcelona) (ES)

( * ) Notice: Subject to any disclaimer, the term of this patent is extended or adjusted under 35 U.S.C. 154(b) by 0 days.

(21) Appl. No.: 16/433,826

(22) Filed: Jun. 6, 2019

(65) Prior Publication Data
US 2019/0284823 A1    Sep. 19, 2019

Related U.S. Application Data

(62) Division of application No. 15/576,603, filed as application No. PCT/ES2016/070399 on May 26, 2016, now Pat. No. 10,385,577.

(30) Foreign Application Priority Data

May 27, 2015 (ES) .................................. 201530733

(51) Int. Cl.
*E04G 11/50* (2006.01)
*E04G 17/02* (2006.01)
(Continued)

(52) U.S. Cl.
CPC ............ *E04G 11/50* (2013.01); *E04B 1/2403* (2013.01); *E04G 17/02* (2013.01); *E04G 17/04* (2013.01);
(Continued)

(58) Field of Classification Search
CPC .... F16B 2/24; F16B 7/04; F16B 2/248; F16B 7/0493; E04G 11/50; E04G 17/02; E04G 17/04; E04L 31/2403; E04L 2001/2424
See application file for complete search history.

(56) References Cited

U.S. PATENT DOCUMENTS 1,929,302 A    10/1933  Roger
2,998,109 A *  8/1961  Jahn ...................... F16B 7/0493
                                              403/387
(Continued)

FOREIGN PATENT DOCUMENTS

CH              294607 A      11/1953
CN           203210495 U       9/2013
(Continued)

OTHER PUBLICATIONS

Spanish Search Report for Patent Application No. 201530733, dated Jan. 28, 2016 in 5 pages.
(Continued)

*Primary Examiner* — Adriana Figueroa
(74) *Attorney, Agent, or Firm* — Knobbe, Martens, Olson & Bear, LLP

(57) ABSTRACT

The invention relates to a device for dismountably connecting two intersecting formwork beams, which comprises a single-component elastic structure with two arms joining together respective areas for pressing the two beams together in support areas, and which can longitudinally slide over one of the beams until it reaches the other beam, the device being elastically deformed by means of pressure or impact thereon, so as to clamp or hold both beams and press them together.

14 Claims, 36 Drawing Sheets

(51) Int. Cl.
*E04G 17/04* (2006.01)
*F16B 2/24* (2006.01)
*F16B 7/04* (2006.01)
*E04B 1/24* (2006.01)

(52) U.S. Cl.
CPC ............... *F16B 2/24* (2013.01); *F16B 2/248* (2013.01); *F16B 7/04* (2013.01); *F16B 7/0493* (2013.01); *E04B 2001/2424* (2013.01)

(56) References Cited

U.S. PATENT DOCUMENTS

| | | | |
|---|---|---|---|
| 3,102,614 | A | 9/1963 | Lydard |
| 3,669,394 | A * | 6/1972 | Loucks ................... E04F 21/05 248/218.4 |
| 4,429,436 | A | 2/1984 | Jensen |
| 4,559,751 | A | 12/1985 | Rogers |
| 4,569,172 | A * | 2/1986 | Weinar ................ E04F 13/0821 52/281 |
| 4,735,030 | A | 4/1988 | Judkins |
| 5,466,087 | A | 11/1995 | Doole |
| 5,577,699 | A | 11/1996 | Gardner et al. |
| 5,788,403 | A * | 8/1998 | Dison ..................... E04B 1/944 248/228.7 |
| 8,448,404 | B2 * | 5/2013 | Johnson ................... E04O 5/18 52/677 |
| 8,720,155 | B1 | 5/2014 | Robell |

FOREIGN PATENT DOCUMENTS

| | | | |
|---|---|---|---|
| CN | 204317151 U | 5/2015 | |
| DE | 202010004268 U1 | 7/2010 | |
| EP | 2309077 A2 | 4/2011 | |
| FR | 2159775 A5 * | 6/1973 | ............... F16B 7/04 |
| FR | 2159775 A5 | 6/1973 | |
| FR | 2251229 A5 | 6/1975 | |
| FR | 2303979 A1 | 10/1976 | |
| FR | 2965317 A1 * | 3/2012 | ............. B65D 19/06 |
| FR | 2965317 A1 | 3/2012 | |
| GB | 894043 A * | 4/1962 | ............... F16B 2/248 |
| GB | 894043 A | 4/1962 | |
| GB | 1207741 A * | 10/1970 | ............... F16L 3/24 |
| WO | WO-9727404 A2 * | 7/1997 | ............. E04C 2/428 |

OTHER PUBLICATIONS

Chinese Office Action for Application No. 201680030104.4, dated Jul. 23, 2019 in 9 pages.

* cited by examiner

DEVICE FOR DISMOUNTABLY CONNECTING TWO INTERSECTING FORMWORK BEAMS

CROSS-REFERENCE TO RELATED APPLICATIONS

This application is a divisional of U.S. application Ser. No. 15/576,603, filed on Nov. 22, 2017 as the U.S. National Phase under 35. U.S.C. § 371 of International Application PCT/ES2016/070399, filed May 26, 2016, which claims priority to Spanish Patent Application No. P 201530733, filed May 27, 2015. The disclosures of the above-described applications are hereby incorporated by reference in their entirety.

FIELD OF THE INVENTION

The present patent for an invention relates to a device for dismountably connecting two intersecting formwork beams, conferring appreciable features of novelty and inventive step.

The formwork beams will be wooden, metal or combined I-beams, i.e., in the case of combined, they will be formed by a metal portion and a wooden portion.

BACKGROUND OF THE INVENTION

Wooden I-beams are widely used in the construction industry in most industrially advanced countries and are intended particularly for supporting formwork, preferably for roofs.

I-beams, whether wooden, metal or combined, are traditionally installed on two levels, a lower level of beams supported directly by props and an upper level of beams arranged perpendicularly to the former and supported on the first ones.

Wooden I-beams are normally joined together by nailing. This is a laborious, though effective system which, apart from its simplicity and adaptability, has many drawbacks, such as a shortening of the service life of the beams through the deterioration that is caused by the action of the nails, by disassembly and removal of the nails, which require considerable manpower, and by the fact that it is difficult to quantify the strength of the joint, since this depends on many variable factors, such as the diameter of the nail, the angle and depth of nailing, the state of the wood etc.

In addition to the procedure for connecting wooden I-beams by nailing, other connection systems are also known, such as making clamps of various kinds by using threaded bolts and clamping nuts, as well as wedge systems. In all these cases, manual clamping is required, which therefore provides discretion and therefore variability.

SUMMARY OF THE INVENTION

To overcome the drawbacks mentioned and to produce devices, for connecting wooden, metal or combined I-beams, having properties of being easy to apply, having constant and readily controlled clamping pressures, having little dependency on human action for mounting, the inventor has, after much research and testing, successfully produced a new device for connecting intersecting formwork beams which has the above-mentioned features together with that of easy recovery from one building site to another, by being easily dismounted without impairing its structural and functional properties.

The device substantially comprises a single-component structure made of resilient material and having two compression regions separated from each other, for simultaneously clamping the two beams to be joined at their support regions, connecting one of the beams on top of the other, and said compression regions being joined together by intermediate arms.

The present description will refer to wooden I-beams, but the invention will also apply equally to combined wooden/steel beams and combinations of steel beams with wooden beams and/or combined beams.

In a preferred embodiment, the device according to the invention is preferably made from a metal rod having the necessary properties and thickness for its size and for the task to be achieved, and having a single-component structure, taking the form of two substantially vertical arms that end at the bottom in a U- or V-shaped section that clasps the lower face of the upper flange of the beam that is located below in the joint, or the lower face of a beam, said arms ending at the top in respective straight extensions intended for pressure-coupling onto the lower flanges of the beam located above, in other words, the beam in the beam joint that is resting on the lower, supporting beam and is intended to receive, on its upper face, the formwork boards for a floor.

Preferably, each of the two assemblies formed by each of the intermediate arms and its corresponding extension ends, at the side opposite the U- or V-shaped bridge, in an end portion, said end portions being mutually coaxial to allow the device to tilt about the axis of coaxiality of the end portions. In especially preferred embodiments, the end portions are perpendicular to the intermediate arms.

The lower bridge, formed by the intermediate arms and the horizontal U- or V-shaped section, fits by means of the latter onto the lower face of an upper side flange of the beam located below in the joint, acting by pressure through its U- or V-shaped section on the lower side of said flange or the lower face of the beam. The upper extensions of the device also preferably take on a very open U-shaped structure, each of them fitting onto a respective lower flange of the upper beam of the assembly of two beams that are to be dismountably connected.

The material of the device can be steel or a synthetic material, such as a plastics material or a composite.

The material of the steel device can be a steel having high resilience properties, optionally heat-treated, so that once it is applied between the two beams that are to be connected, the pressure exerted on the joint is constant, ensuring that the two beams are connected and preventing the upper beam from tipping, especially when workers move overhead while mounting the formwork boards.

The device according to the present invention can also be produced in the form of a single component of folded sheet, forming two lateral arms with their upper edges folded and a lower bridge for pressing on the lower face of the upper flange of one of the lower beams of the assembly of two beams to be joined.

In summary, the invention comprises a device for dismountably connecting two intersecting formwork beams, characterised in that it comprises a resilient single-component structure having two intermediate arms joining together respective regions for pressing the two beams together at support regions, and which can slide longitudinally over one of the beams until it reaches the other beam and, by means of pressure or impact on the device, elastic deformation of the device is produced so as to clamp or hold both beams and press them together. The single-component structure can be composed of a rod made of resilient material that has two intermediate arms that extend at their upper ends into respective extensions for pressing on support regions of one of the beams to be connected, while at the other end they extend into a U- or V-shaped bridge for pressing on the support region of the opposite beam to be joined.

The two intermediate arms both form double elbows in their upper portion, joined to respective, substantially straight and parallel extensions, or both form double elbows in their upper portion that extend into respective vertical sections ending in respective straight extensions that are substantially perpendicular to said vertical sections.

In one aspect, the two intermediate arms form between them a slight angle of divergence that opens upwards.

According to another aspect, the U-shaped bridge is planar and the V-shaped bridge has arms that are not planar, but have respective elbows, the vertices of which exert pressure on one of the beams in the joint.

According to another aspect, the upper extensions for pressing on the flanges of one of the beams and the lower bridge for pressing on a flange of the other beam of the joint are positioned so as to converge slightly.

The device can be slid along one of the beams to be joined by the device or tilted over one of the beams to be joined by the device.

According to another aspect, the straight upper ends are capable of sliding along lateral slots in the upper beams of the joints of two intersecting beams. The slot is made in the wooden flank of the upper beam of the joint, a combined steel/wooden beam, or the lateral slots in the upper beam are formed in the lower, steel portion of a combined beam.

It is also envisaged that the upper ends of the device are inserted into holes in the metal portion of the combined upper beam of the joint.

Alternatively, the region of pressure on the flanges of one of the beams is formed by planar flanges that are joined by lateral connecting plates to a lower joining section that has a wide front extension having an inclined lug, defining the edge pressing on the flange of the other beam of the joint.

Preferably, each of the extensions has a buffer intended to come into contact with a beam. The buffer can be an elbow.

Preferably, the extensions converge.

In an especially preferable embodiment, the points of contact defined by the buffers are located on the plane formed by the axis of coaxiality of the end portions and the region of the device supporting the other beam at the aforementioned bridge.

Advantageously, the distance between buffers is less than the distance between intermediate arms. This feature allows tilting relative to the axis formed by the upper end portions until the central region of the U-shape comes into contact with the lower face of the bearing beam.

In especially advantageous embodiments, the intermediate arms come into contact with the side face of the lower, or bearing beam.

In the present description, the position of the bearing beam, which supports a beam above it, is described as lower. In some embodiments, the upper beam also, in turn, bears the device.

BRIEF DESCRIPTION OF THE DRAWINGS

To aid understanding, explanatory drawings of exemplary embodiments of the present invention are included by way of example, and are simply non-limiting examples.

DETAILED DESCRIPTION OF THE PREFERRED EMBODIMENTS

Figure 1:
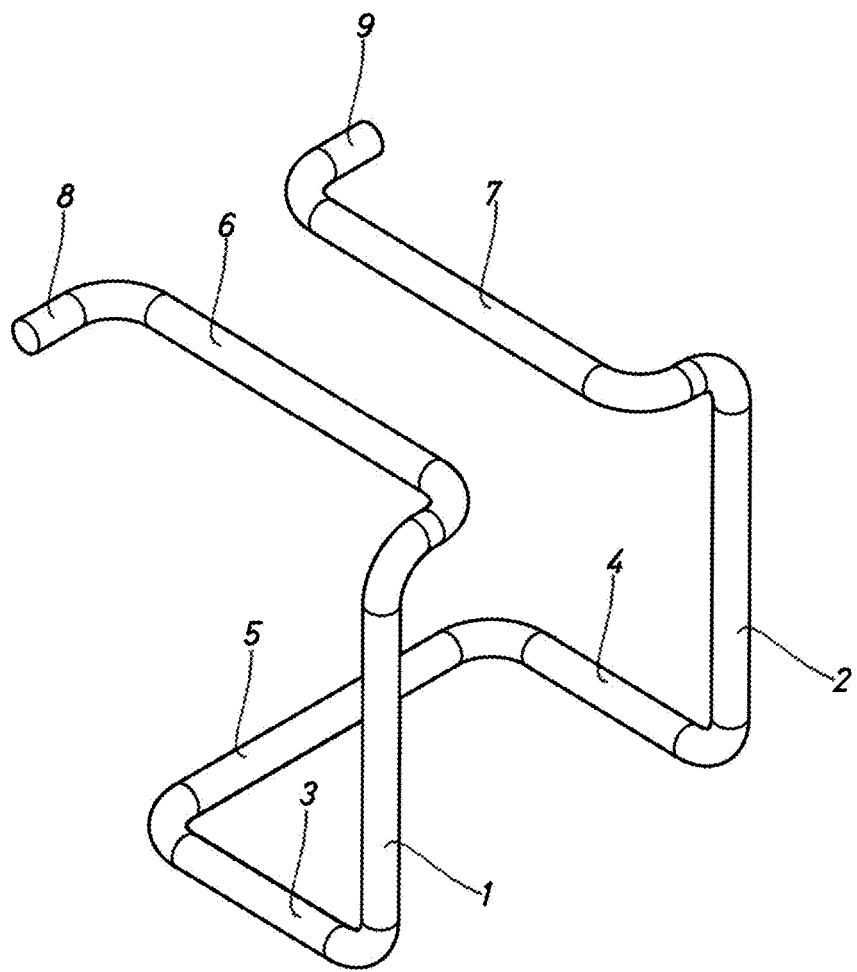
FIG. 1 is a perspective view of a device according to the present invention, showing the upper extensions of the vertical arms positioned from front to back.
Figure 2:
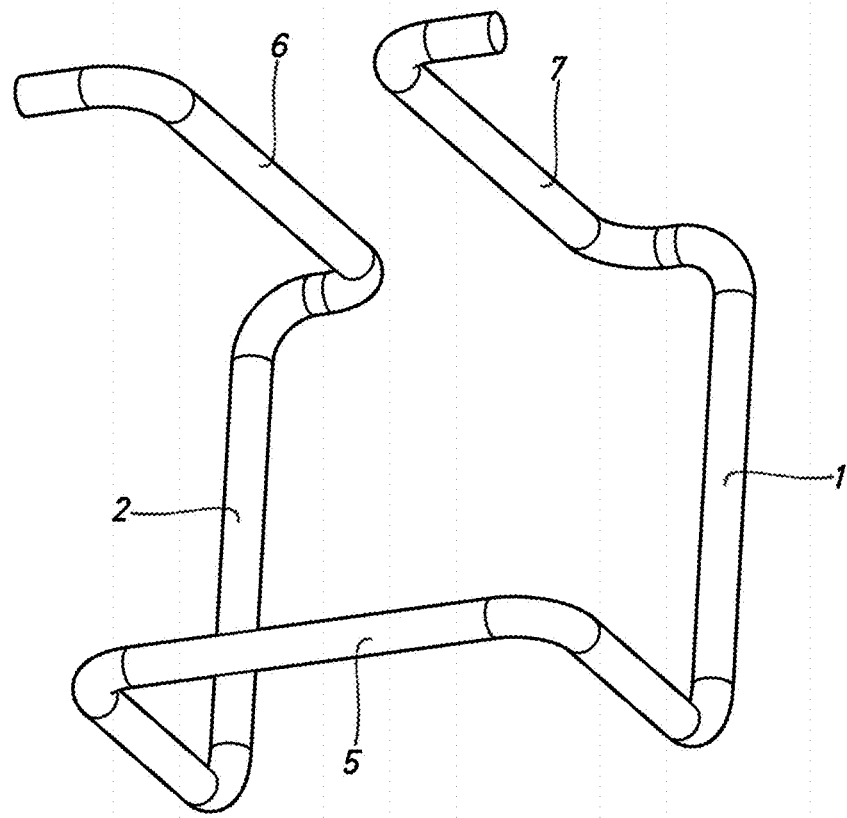
FIG. 2 is a perspective view similar to that in FIG. 1 in which the device has been shown rotated by 90° relative to the view in FIG. 1.
Figure 3:
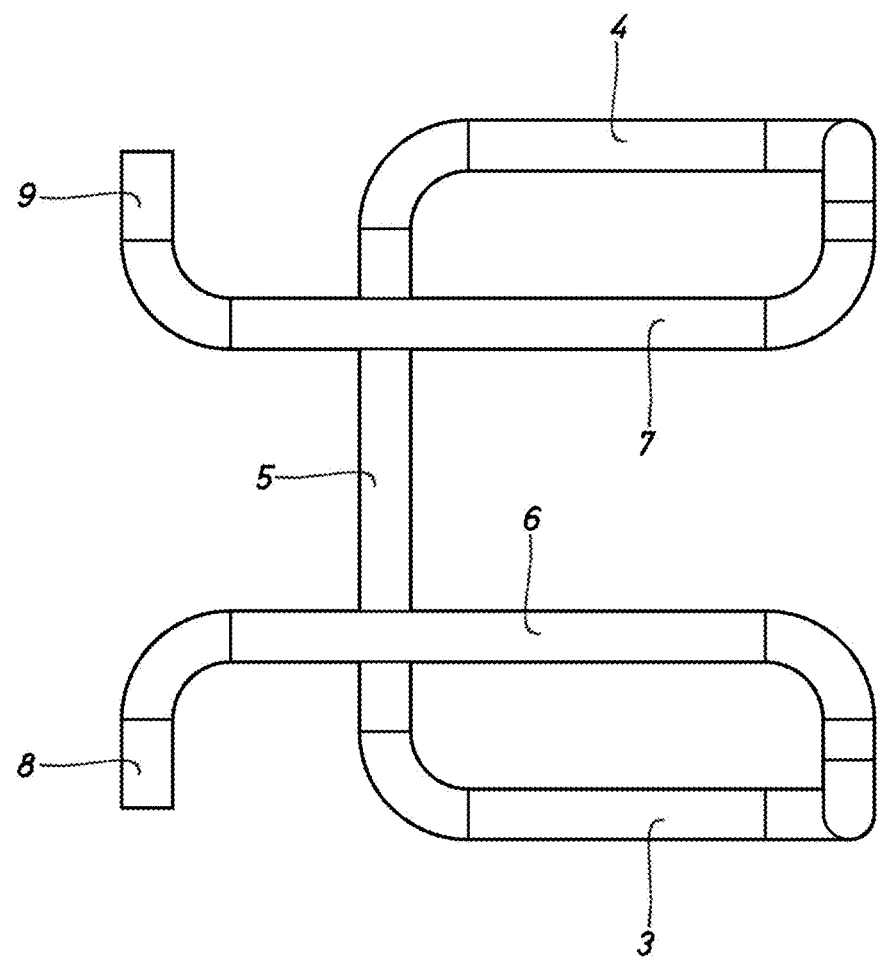
FIG. 3 is a plan view of the device shown in FIGS. 1 and 2.

As can be seen in FIGS. 1 to 3, the device for dismountably connecting intersecting formwork beams, according to the present invention, comprises two arms that diverge slightly upwards -1- and -2-, and are joined to respective, substantially horizontal sections -3- and -4-, which together with a crosspiece -5- form a U- or V-shaped bridge. At the top, the arms -1- and -2- extend into respective straight, substantially horizontal extensions -6- and -7-. The various components mentioned, together forming in succession the connection device based on a resilient steel rod, are joined by means of multiple curved elbows, which have not been specifically numbered for greater clarity of the figures. The straight extensions of the upper portion -6- and -7- end in respective folded regions -8- and -9- positioned in the same plane as determined by the extensions -6- and -7-.

Figure 4:
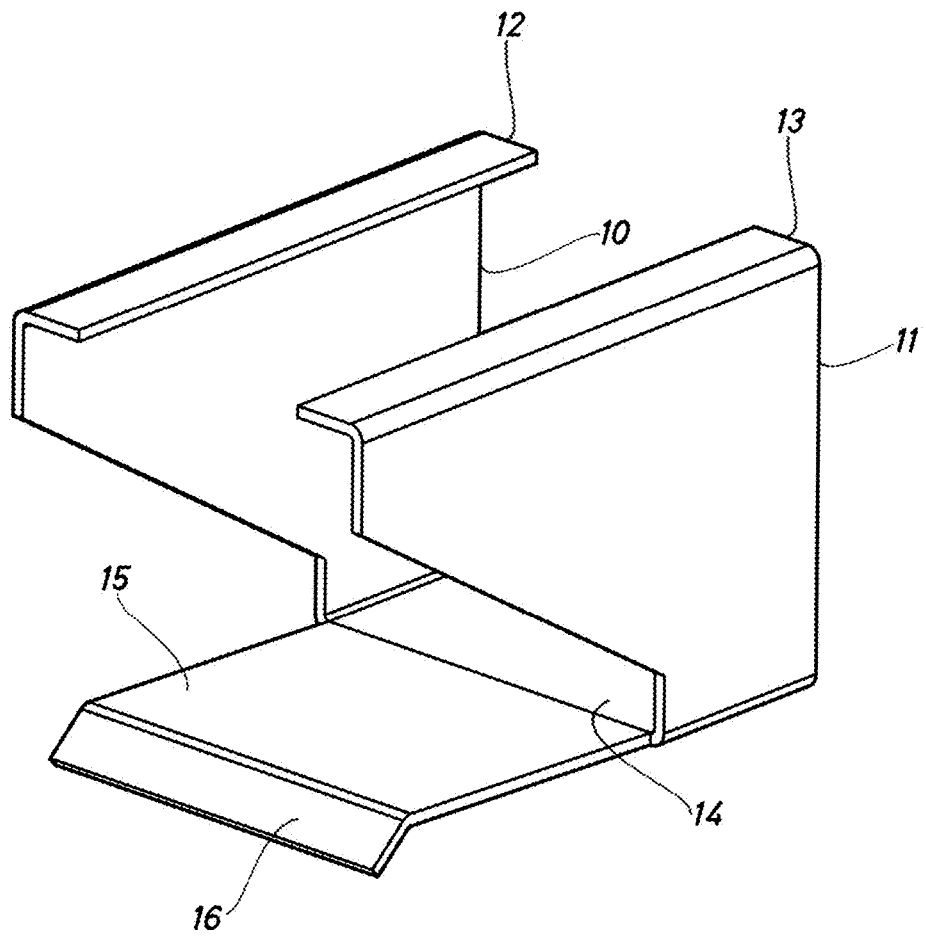
FIG. 4 is a perspective view of the device according to the invention in sheet form.
Figure 5:
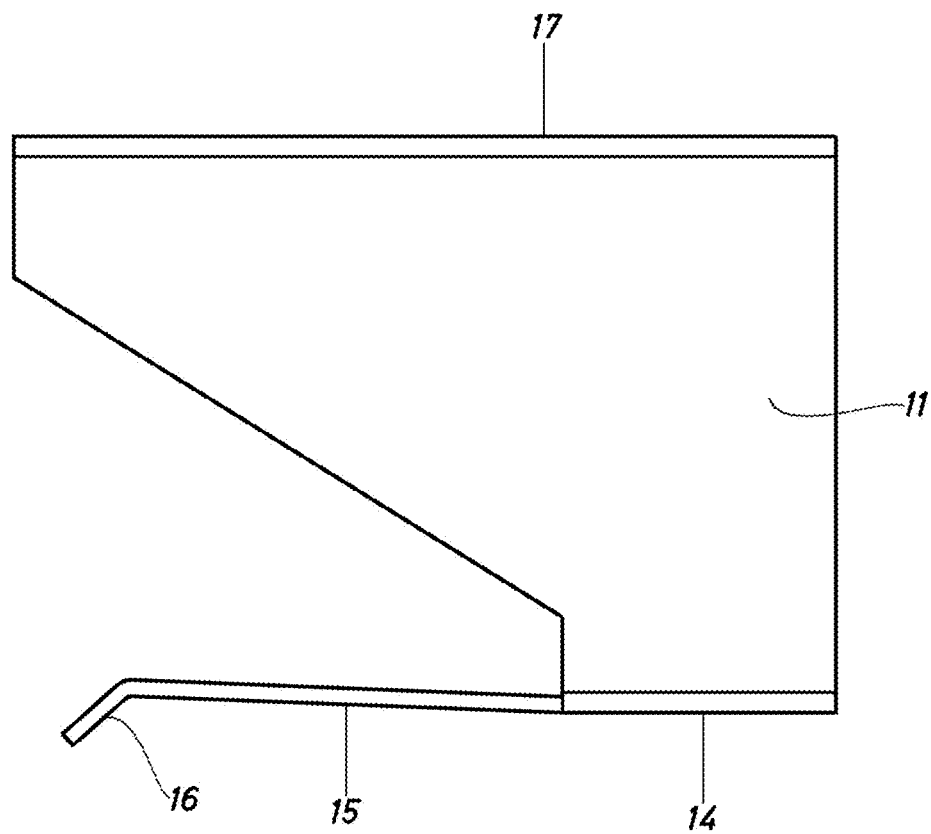
FIG. 5 is a side elevation view of the device shown in FIG. 4.
Figure 6:
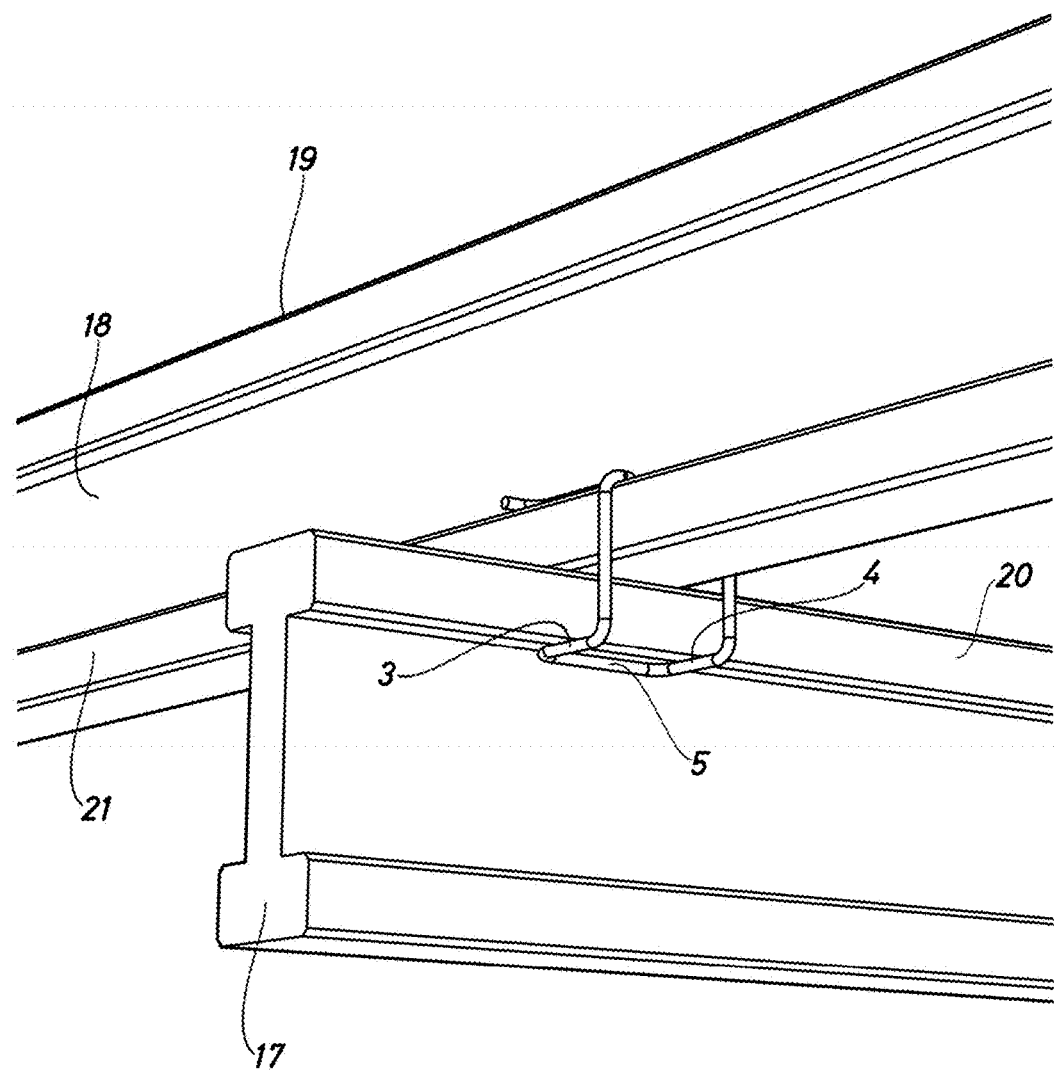
FIG. 6 is a perspective view of two I-beams joined at the point of intersection of a lower beam and an upper beam, by means of a device according to the present invention.
Figure 7:
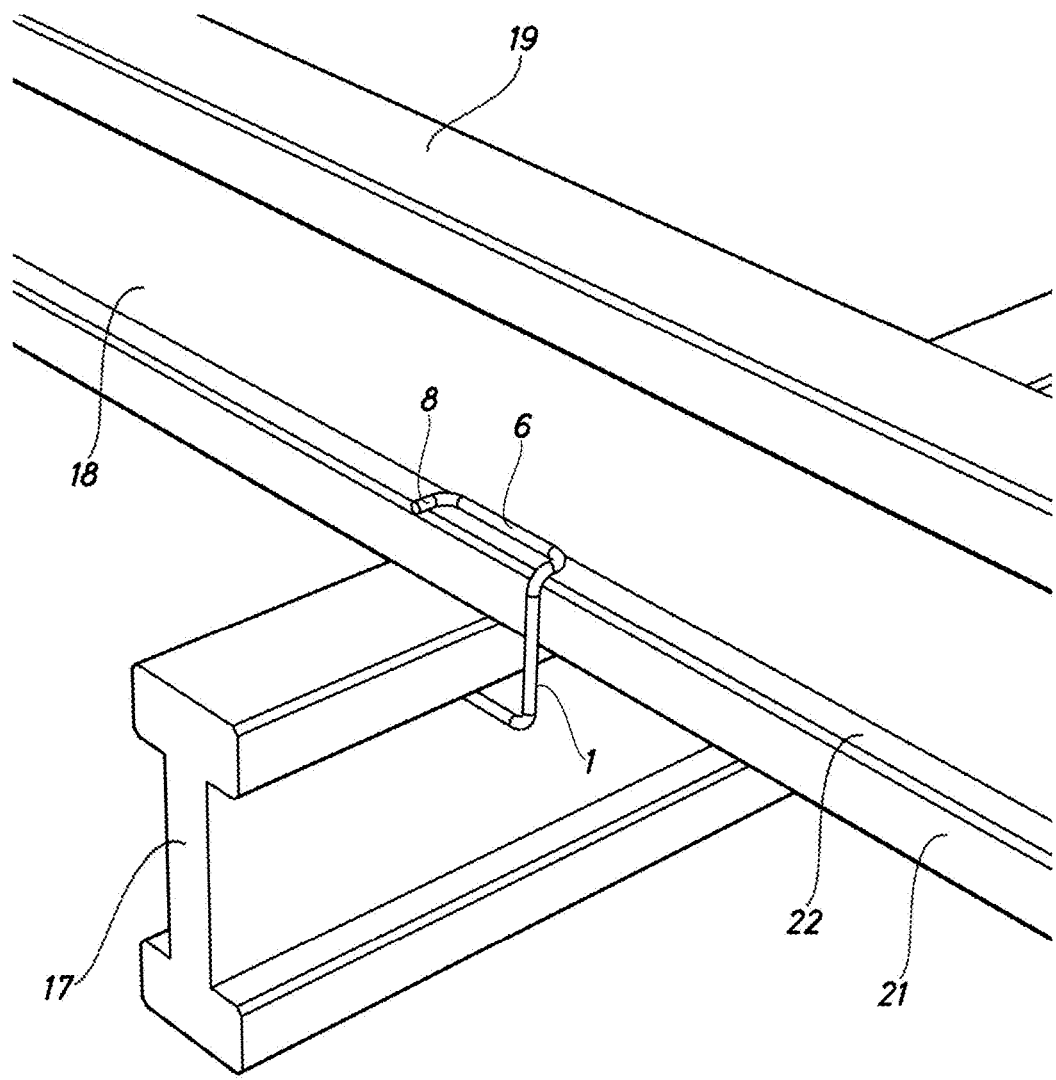
FIG. 7 is a perspective view from above of the same joint shown in FIG. 6.
Figure 8:
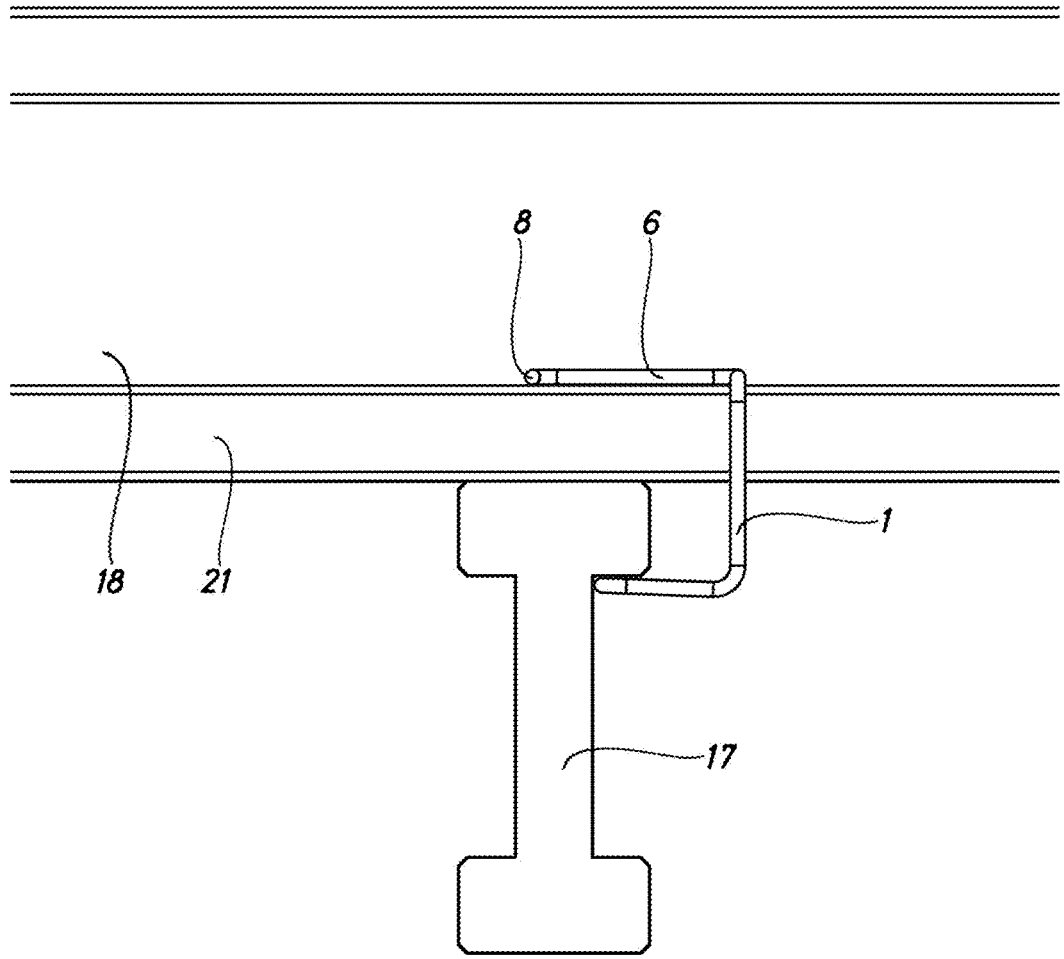
FIG. 8 is a side elevation view of the individual beam joint shown in FIGS. 6 and 7.
Figure 9:
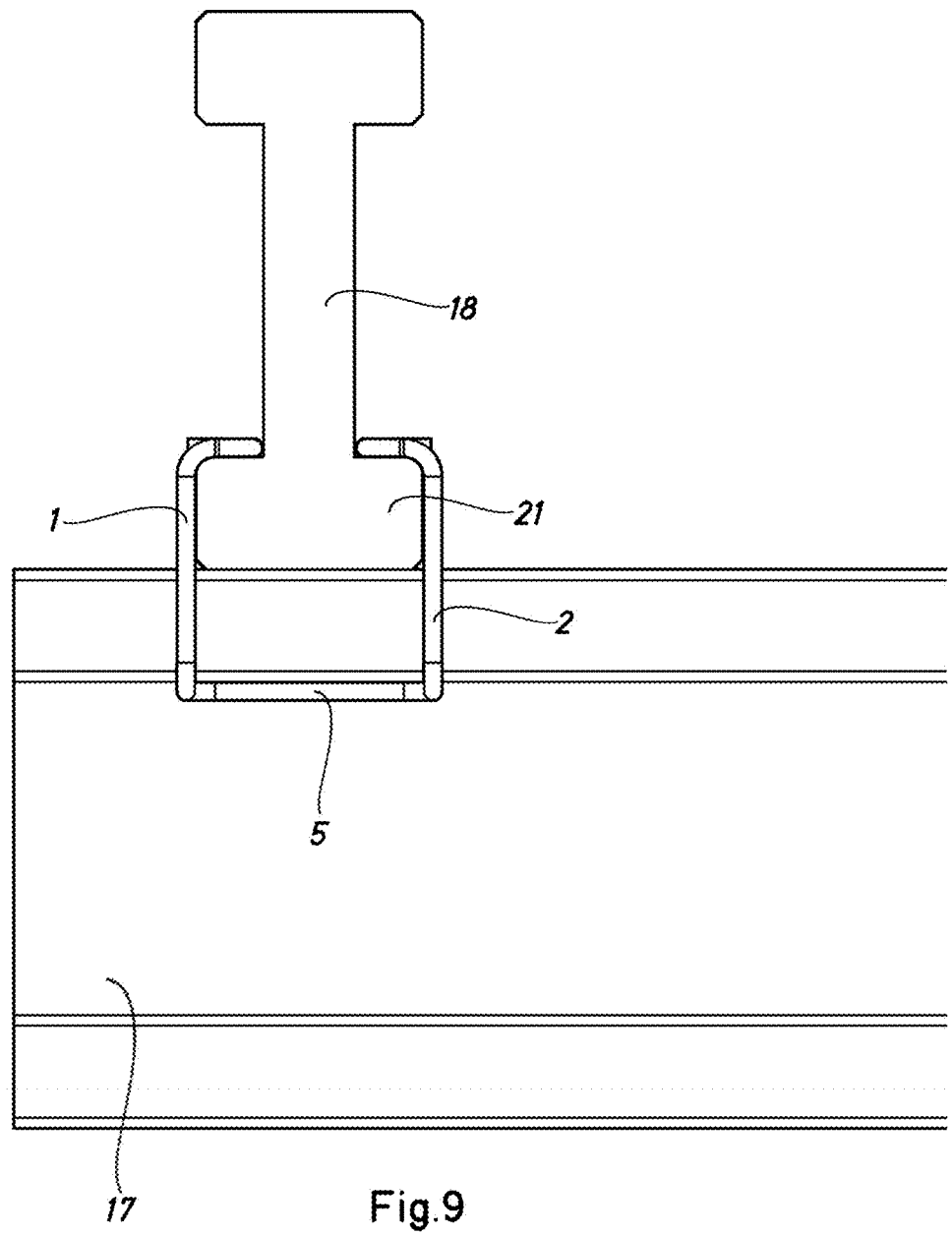
FIG. 9 is a front view of the individual joint.

FIGS. 4 and 5 are a perspective view and a side elevation view, respectively, of a version of the device of the present invention produced in sheet form, in which it can be seen that the bridge formed by the two vertical components is composed of two vertical, parallel sheet walls -10- and -11- ending at the top in the flanges -12- and -13-, which perform the same functions as the combination of the vertical arms -1- and -2- and upper horizontal extensions -6- and -7- in FIGS. 1 to 3. The sheet components -10- and -11- are joined together at the bottom by the horizontal section -14- that extends into a wide front extension -15- ending in a flange -16- that is gently tilted downwards, said components -14-, -15- and -16- as a whole performing the same function as the horizontal, U-shaped sections -3-, -4- and -5- of the version in FIGS. 1 to 3.

The device according to the present invention is intended for dismountably connecting two intersecting formwork beams, being I-shaped wooden, metal or combined beams, for example, the beam located below -17- and the beam located above -18-, shown in FIGS. 6 to 9, the beam -18- resting on the beam -17- and being intended to receive the formwork boards on its upper face -19-. The joint is made by interposing the device according to the present invention, firmly and resiliently, because of its specific features, joining the upper flange -20- of the beam located below to the lower flanges -21- of the beam -18- located above. For this, the crosspiece -5- is supported, exerting pressure on the lower face of the flange -20- of the beam -17-, while the horizontal straight extensions, such as the extension -6- with its end portion -8- and an elbow region that joins it to the vertical arm -1-, press on the upper face -22- of the lower flange -21- of the I-beam -18-, located above in the beam joint formed by the beams -17- and -18-.

Figure 10:
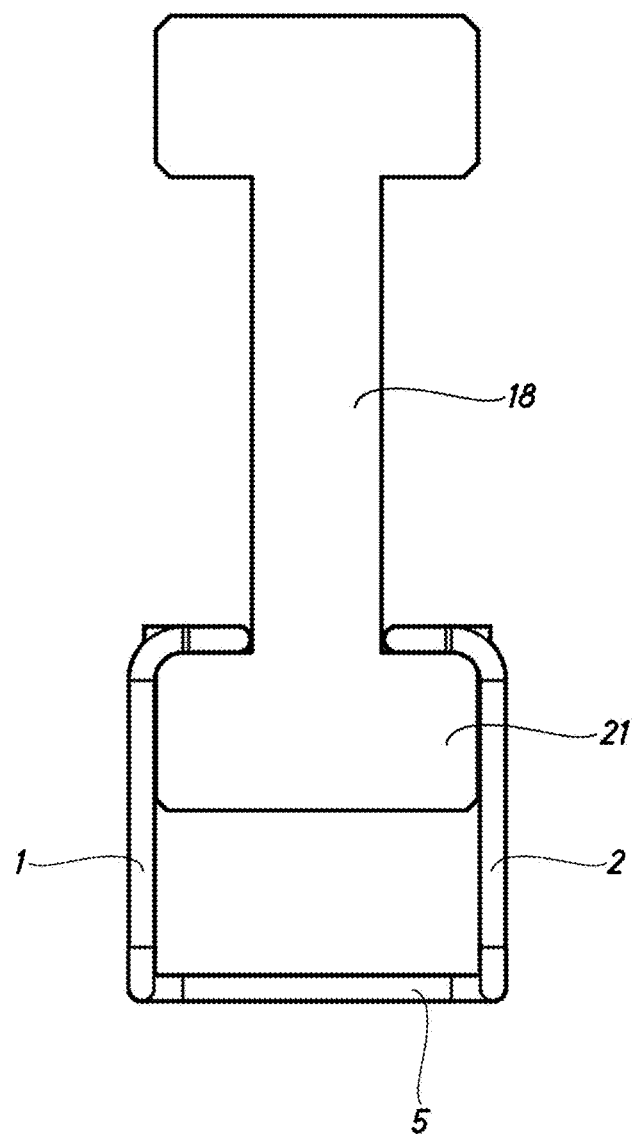
FIGS. 10 and 11 are both schematic front views of the device coupled onto a beam, in the service position and for transport, respectively.

FIG. 10 shows the positioning of the device according to the invention on the lower flanges of the beam -18-, in the position prior to mounting on the lower of the beams constituting the pair of beams to be joined.

Figure 11:
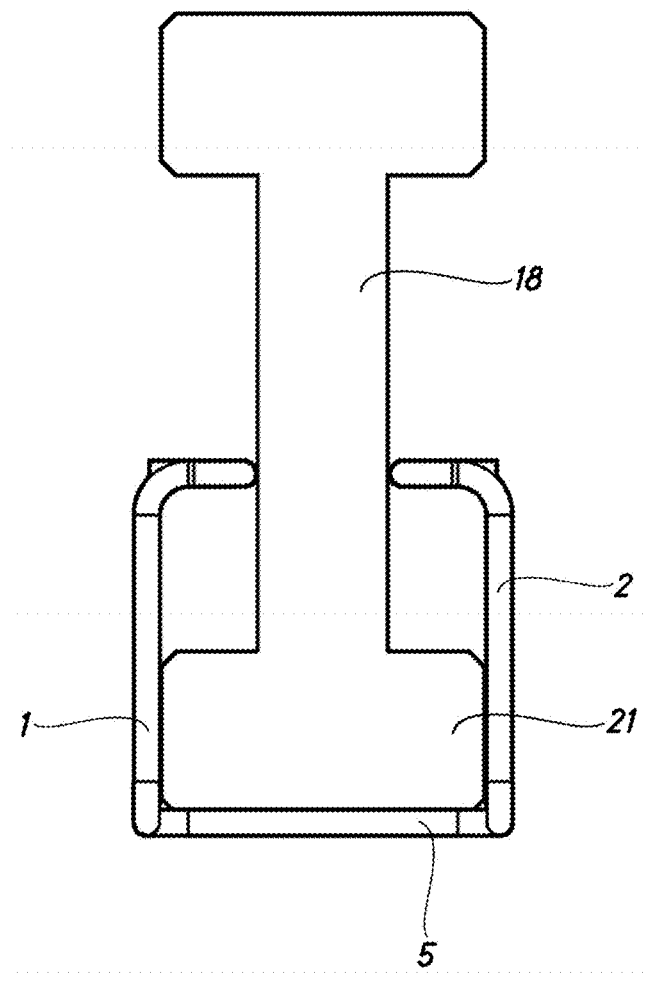

FIG. 11 shows the positioning of the device according to the invention in a similar way to FIG. 10, but in the transport position, in which the device is gently press-fitted between the flanks of the lower flanges of the beam -18-. For this, the vertical arms -1- and -2- have a slight angle of convergence, to facilitate their resilient action in said semi-wedged position.

Figure 12:
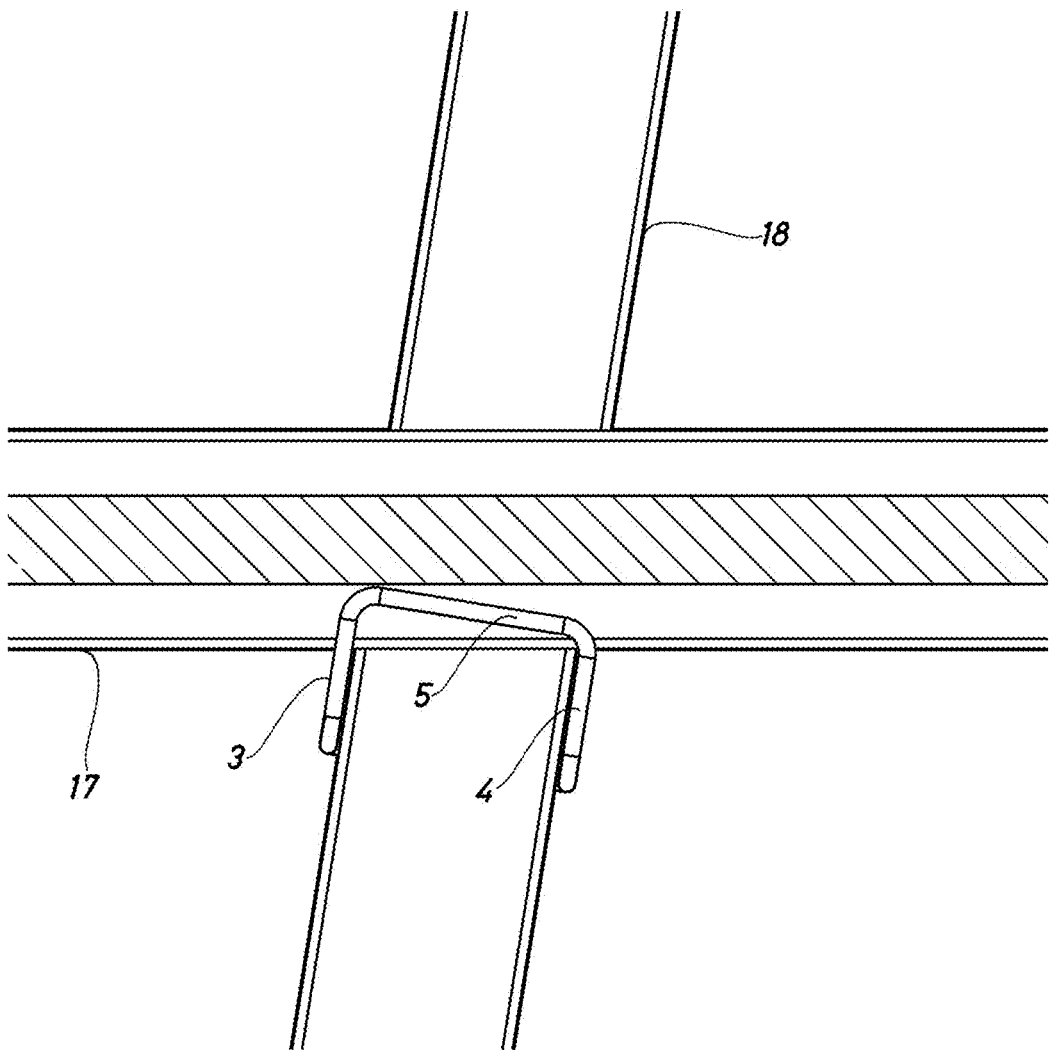
FIG. 12 is a plan view in which the two beams can be seen positioned as a joint forming a specific angle other than 90°.

FIG. 12 shows one of the features of the device according to the invention, which allows slight non-alignment of the usual right-angled arrangement of the beams to be joined, in which situation the structure of the device allows it to continue performing its clamping function irrespective of said divergence of angle. It should be noted that both in the situation shown in the figure and in the case where the device is inserted only partially into its service position, for example in the positions shown in FIGS. 6 and 7, where the elements -5- and/or -6- do not go right to the end, i.e. they are inserted only partially over their corresponding bearing surfaces, the compression force of the device would not vary, which provides heightened safety features.

It should also be noted that, given that the compression force exerted by the device according to the invention depends on its own structure, said exerted force will be independent of the force required to insert the device on mounting, for example, greater or lesser energy at the time of mounting. The essential feature for the device to perform its function consists solely in the pressure components, i.e. for example, the components -5- and -6-, being located above the surfaces to be compressed, irrespective of the greater or lesser degree of penetration onto the latter, or the angle relative to said surfaces to be pressed together, which can vary because of the non-alignment of the beams to be joined or because of a certain divergence of the device itself at the time of mounting.

Figure 13:
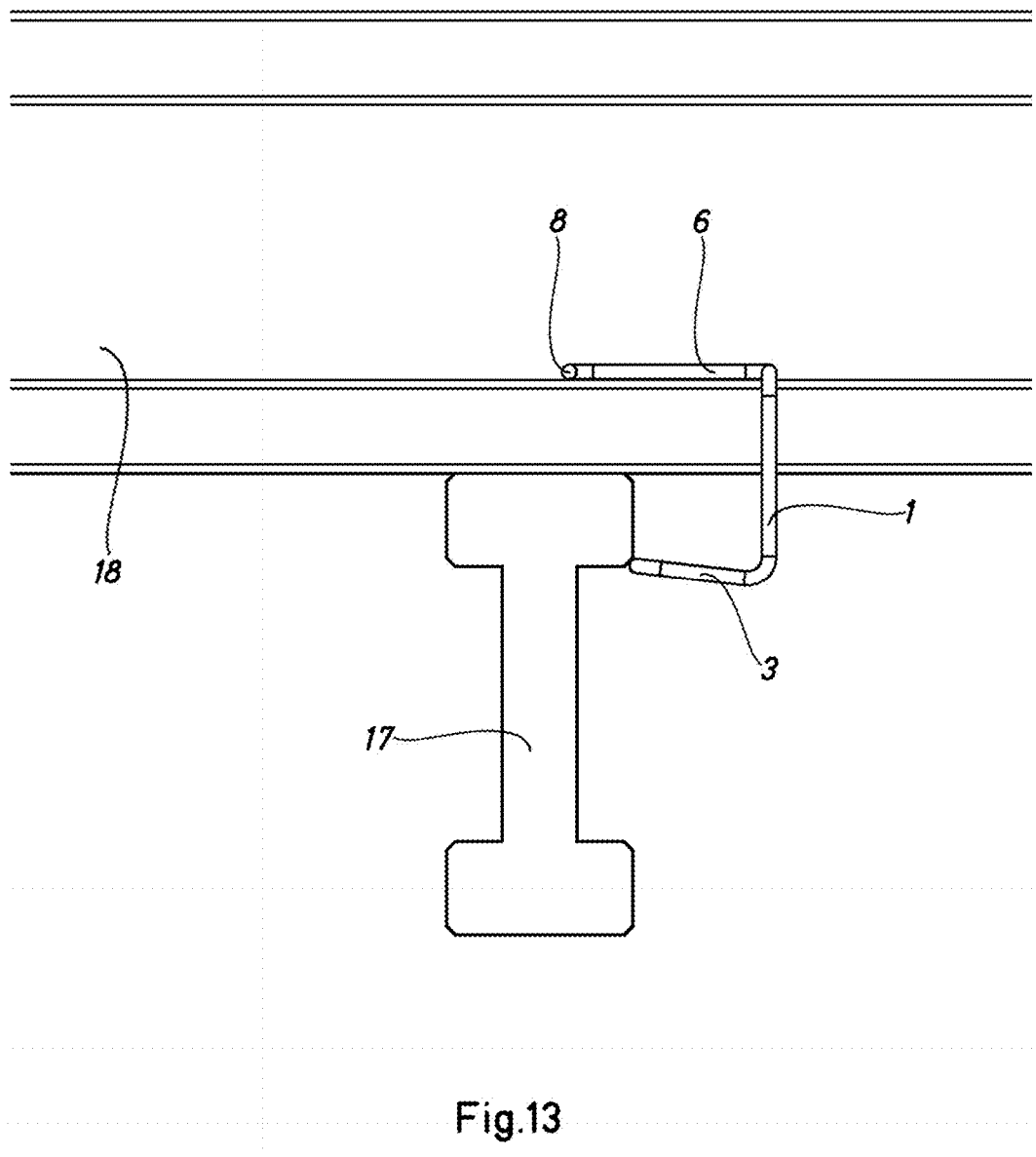
FIG. 13 is a side elevation view, in which the initial positioning of the connection device on the upper flange of the lower beam of a joint can be seen.

FIG. 13 is a view of the positioning of the device producing the joint of an upper beam -18- with a lower beam -17-, in which it can be seen that the substantially horizontal sections, here the horizontal section -3- is shown, form a small angle to the horizontal, i.e. converge slightly relative to the straight extensions -6- and -7- (the latter not shown in said FIG. 13), so as to exert a spring effect when inserted under the upper flange of the beam located below, i.e. the beam -17-. The chamfers at the edges of the beams and the rounding of all the angles and outer regions of the device of the invention allow them to be inserted easily by pressure, without the need for any tool. In this respect, one of the advantageous features of the present invention can be seen, since its single-component nature and its properties of spring-like resilience make it easy to position, and allow it to press evenly and continuously on the components of the beams to be joined, with very simple application using basic tools such as a construction hammer and the like, with no need to tighten nuts, brackets or other components that are used by hand.

Figure 14:
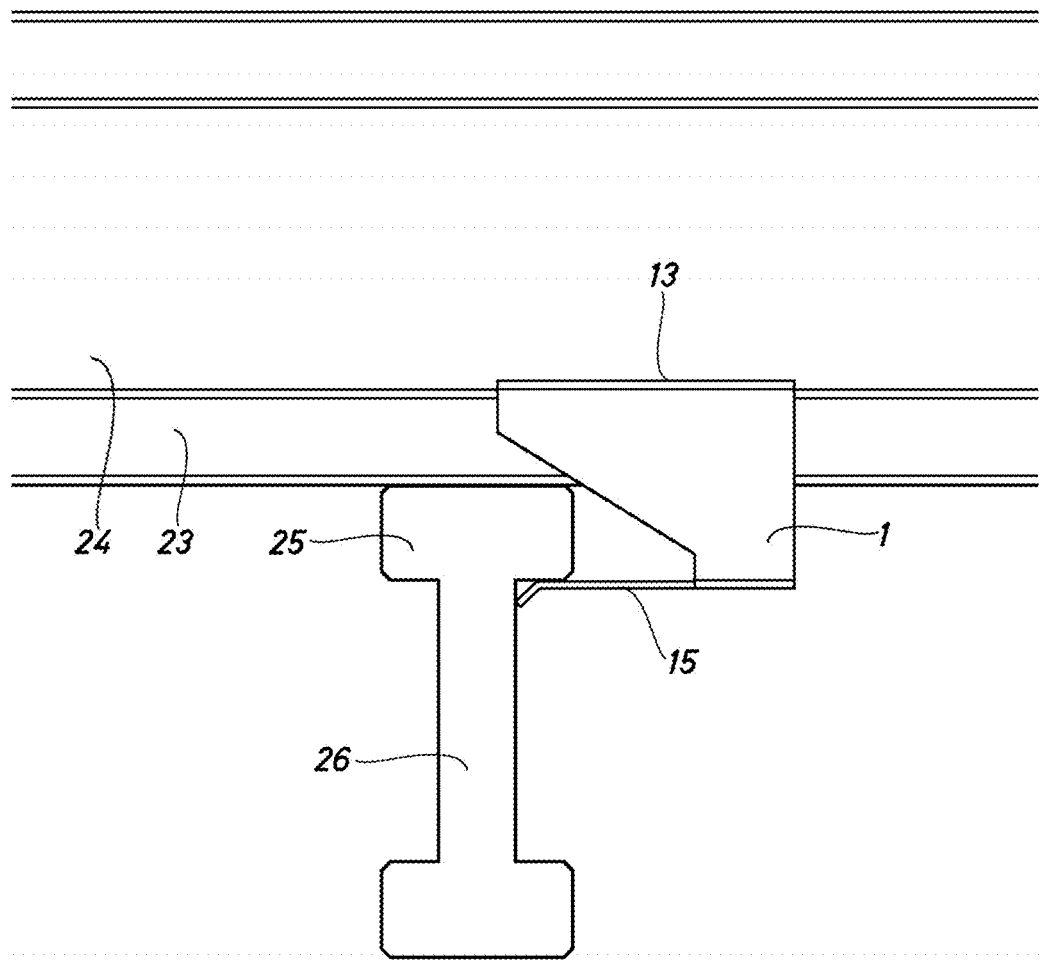
FIGS. 14, 15 and 16 are each views of the positioning of a device according to the invention made in sheet form.
Figure 15:
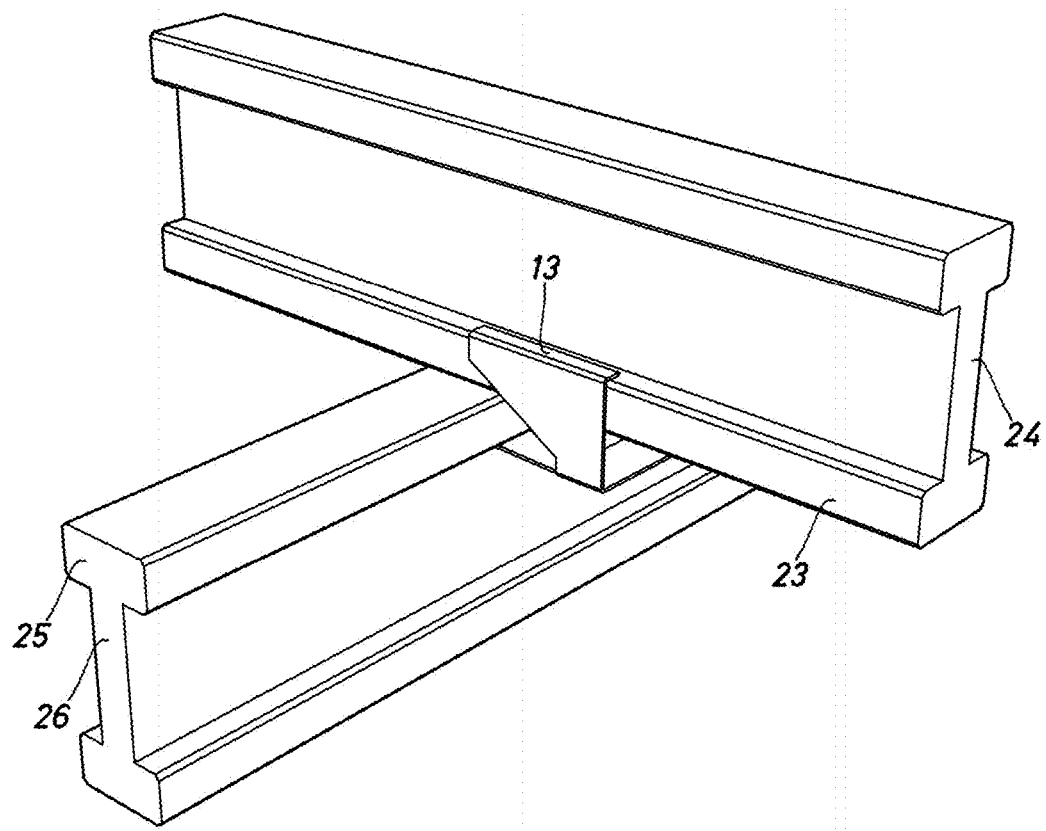
Figure 16:
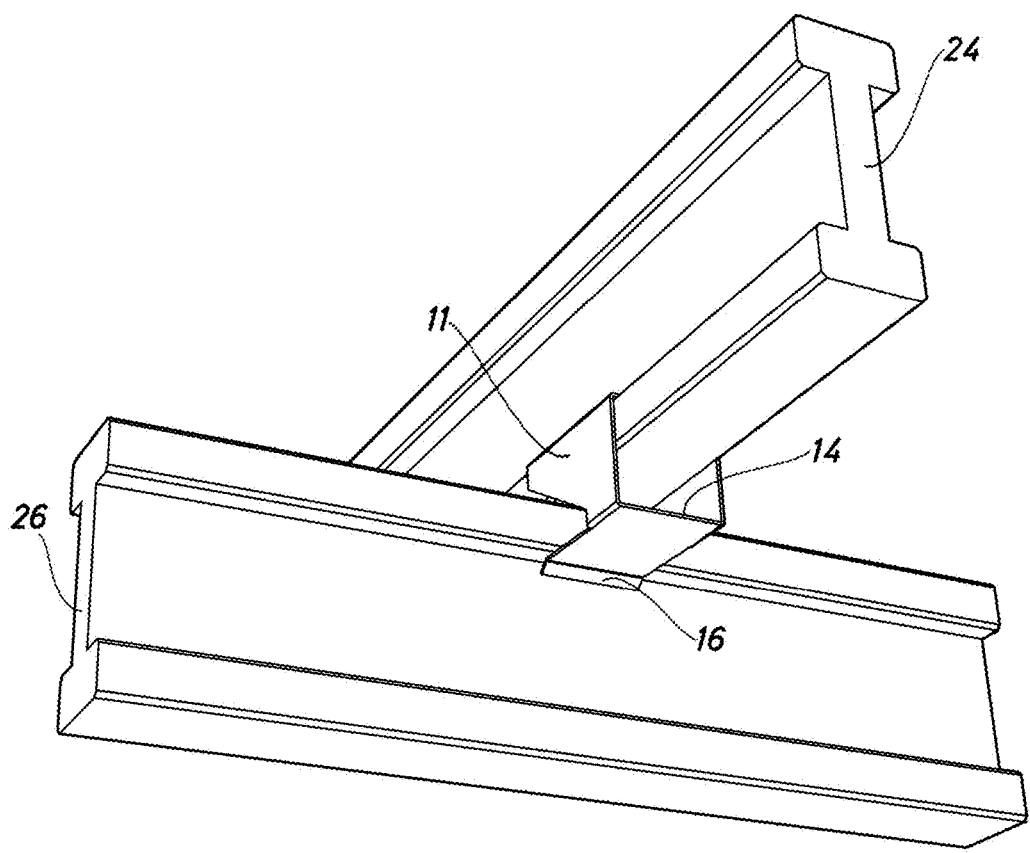
Figure 17:
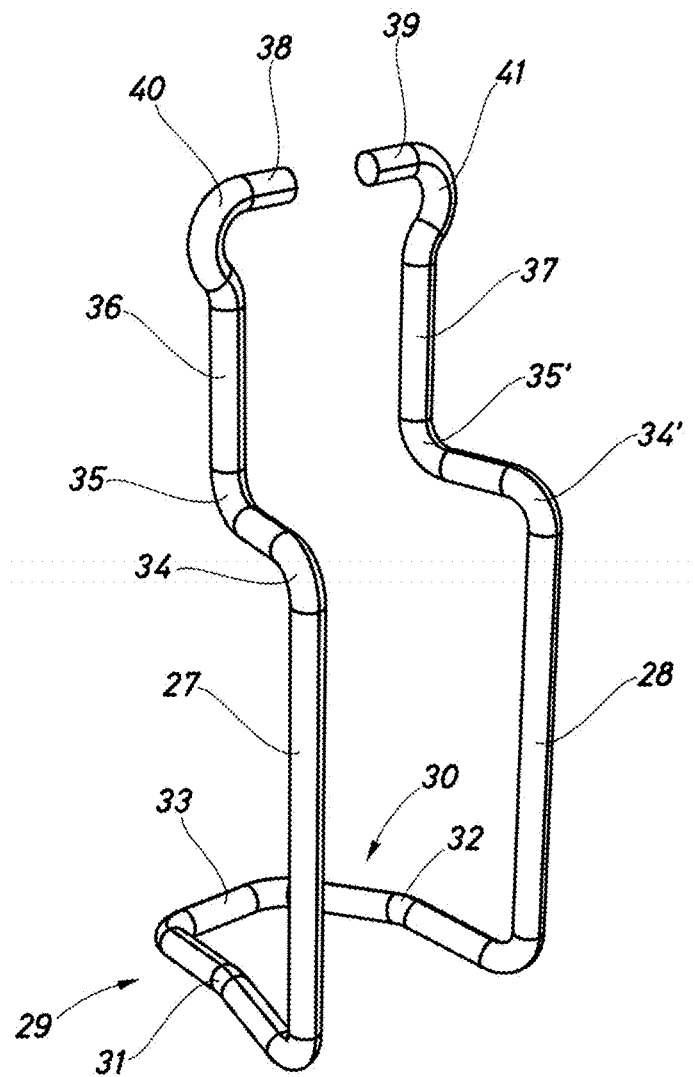
FIGS. 17 to 20 are views, in perspective, side elevation, front elevation and from above, respectively, of a variant of the device according to the present invention.
Figure 18:
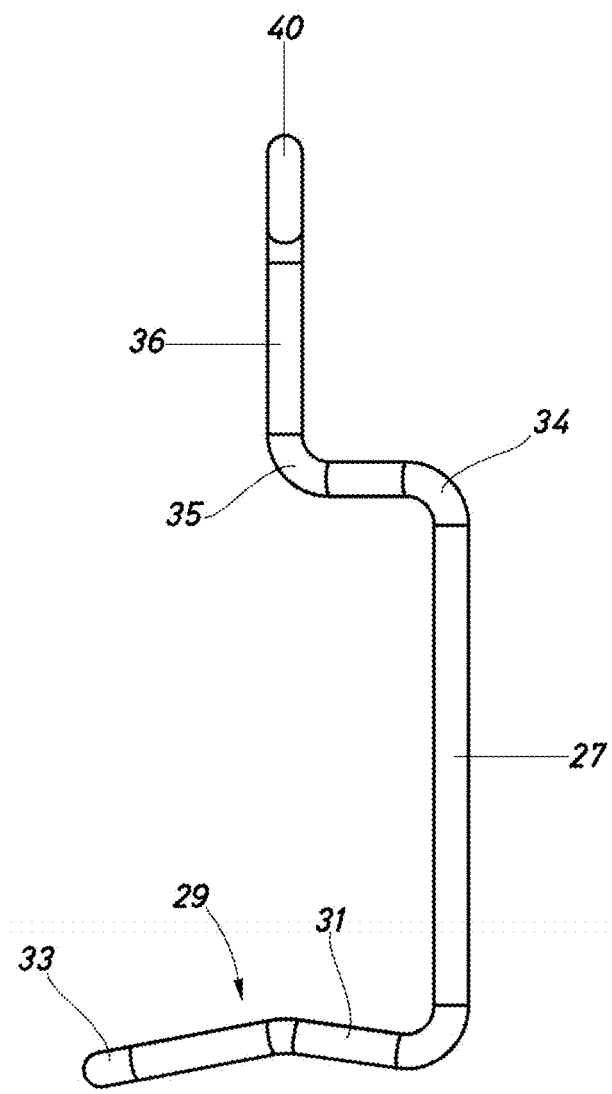
Figure 19:
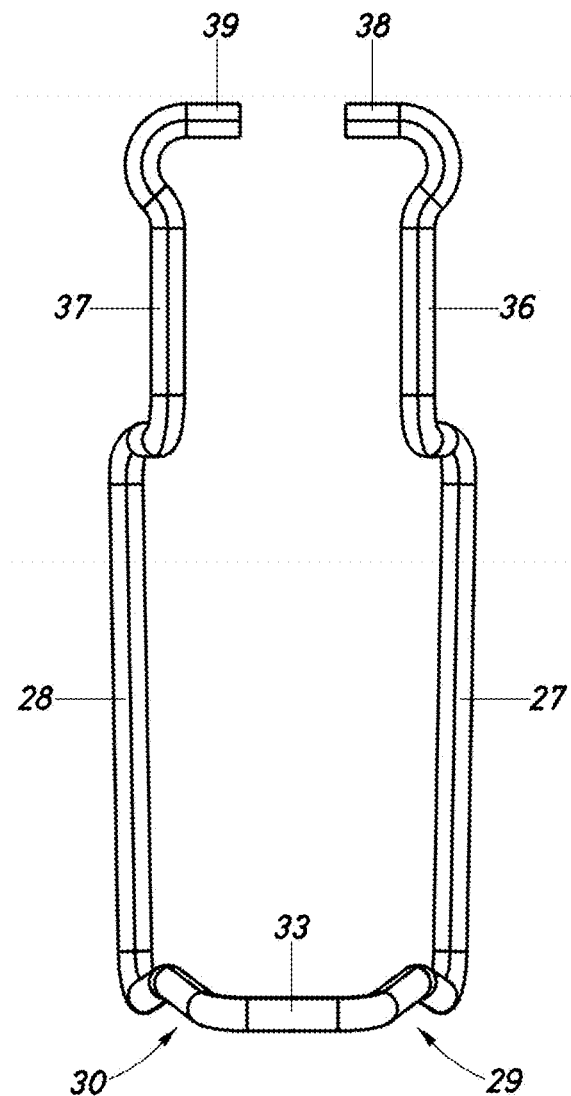
Figure 20:
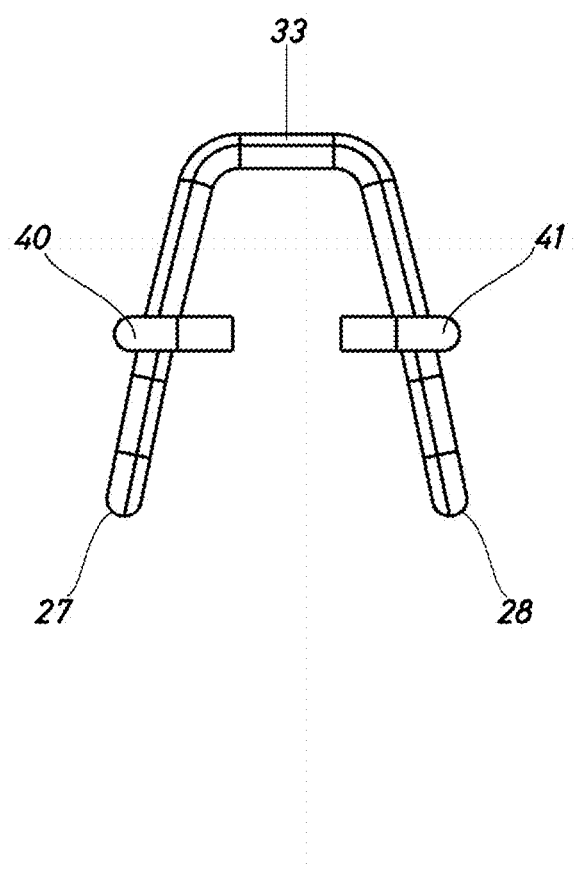

FIGS. 14, 15 and 16 show the mounting of a device according to the invention, made in sheet form, as has been shown in detail in FIGS. 4 and 5. As can be seen in FIG. 14, the device is applied such that the upper flanges, for example the flange -13-, are applied to the upper face of the lower flanges -23- of the beam -24-, located above, while the lower extension -15- presses on the lower face of the upper flange -25- of the beam located below -26 -.

FIGS. 17 to 28 show a variant of the device having a V-shaped bridge and straight, parallel upper extensions, which will be explained below.

Said device has two intermediate arms -27- and -28- similar to the arms -1- and -2- of the variant in FIGS. 1 to 3, which extend into the sections -29- and -30- that feature an intermediate curve or fold, for which reason they take on a very open V-shape, forming respective contact regions or vertices -31- and -32-. Said sections -29- and -30- are joined by a rear crosspiece -33-, which is shorter than the distance between the arms -27- and -28-, so that the lower bridge takes on a shape similar to a V since the sides -29- and -30- open up from their starting point at the crosspiece -33- to their endpoint at the lower portion of the arms -27- and -28-.

At the top, the arms -27- and -28- have respective double elbows -34- and -35-, -34'- and -35'-, extending into vertical sections -36- and -37-, which end in short upper straight sides -38- and -39- having respective elbows -40- and -41- placed in between.

Figure 21:
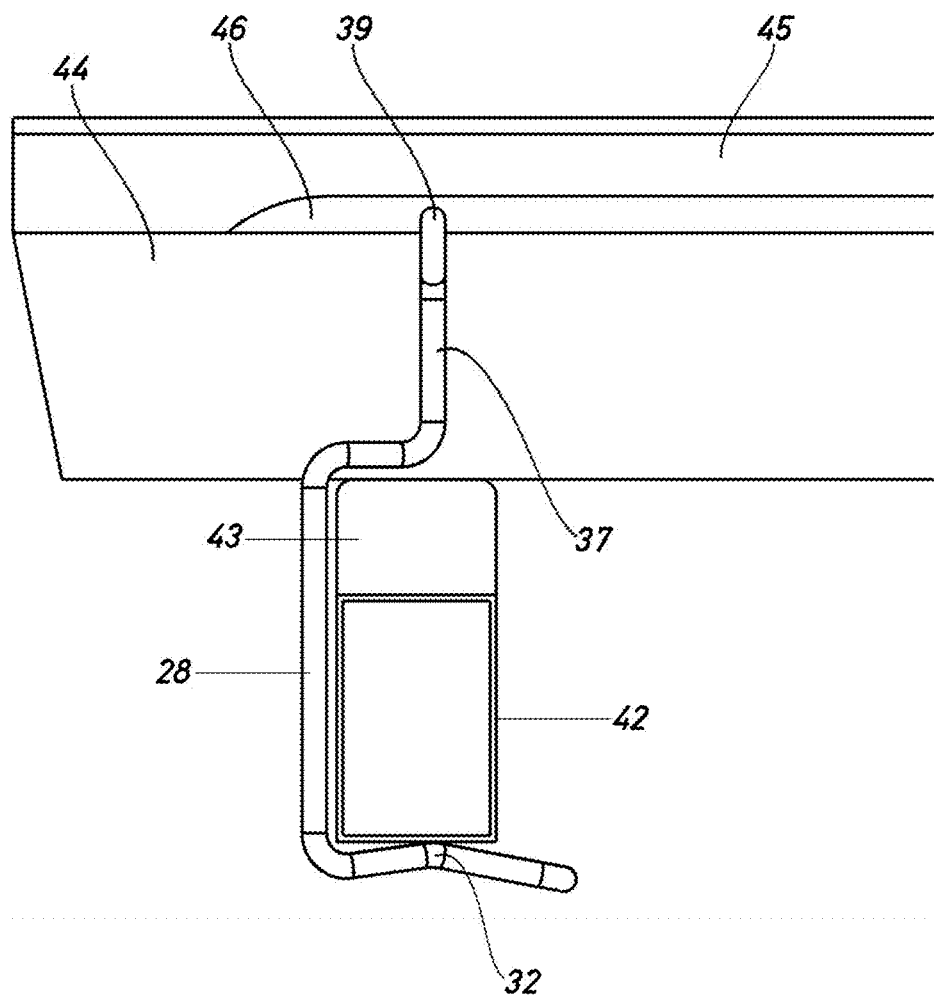
FIG. 21 shows the mounting of the device, connecting two intersecting beams of the combined type.

The coupling of the device can be seen from FIG. 21 onwards, with the example of connecting two combined beams, a lower beam having a metal portion -42- and a wooden portion -43- and an upper beam, also combined, having a metal portion -44- and a wooden portion -45-. The device is guided by its upper ends -38- and -39- shown in FIGS. 17 to 20, which are inserted into lateral slots such as the slot -46- in the wooden portion -45-, pressing on the upper face of the metal portion -44-. The lower vertices, such as the vertex -32- can be seen pressing on the lower face of the metal portion -42- of the lower combined beam.

Figure 22:
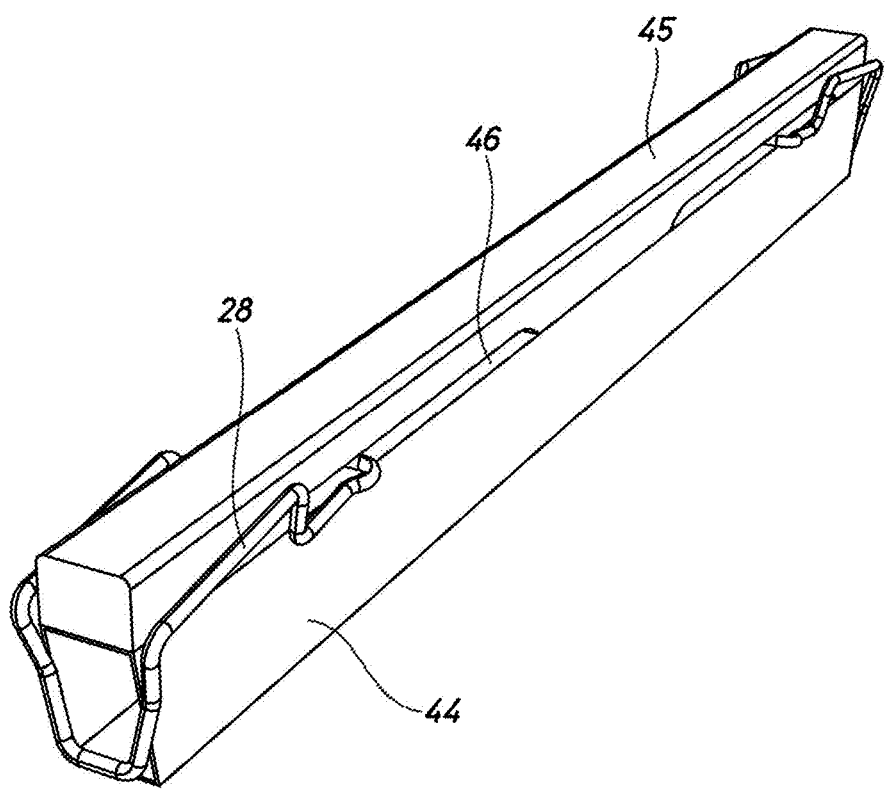
FIG. 22 is a perspective view of the device shown in FIGS. 17 to 20, in the transport position on a combined beam.

The device of this variant can tilt as shown in FIG. 22, so as to be located in a stacked position in which it is semi-wedged against the flanks of the combined beam.

Figure 23:
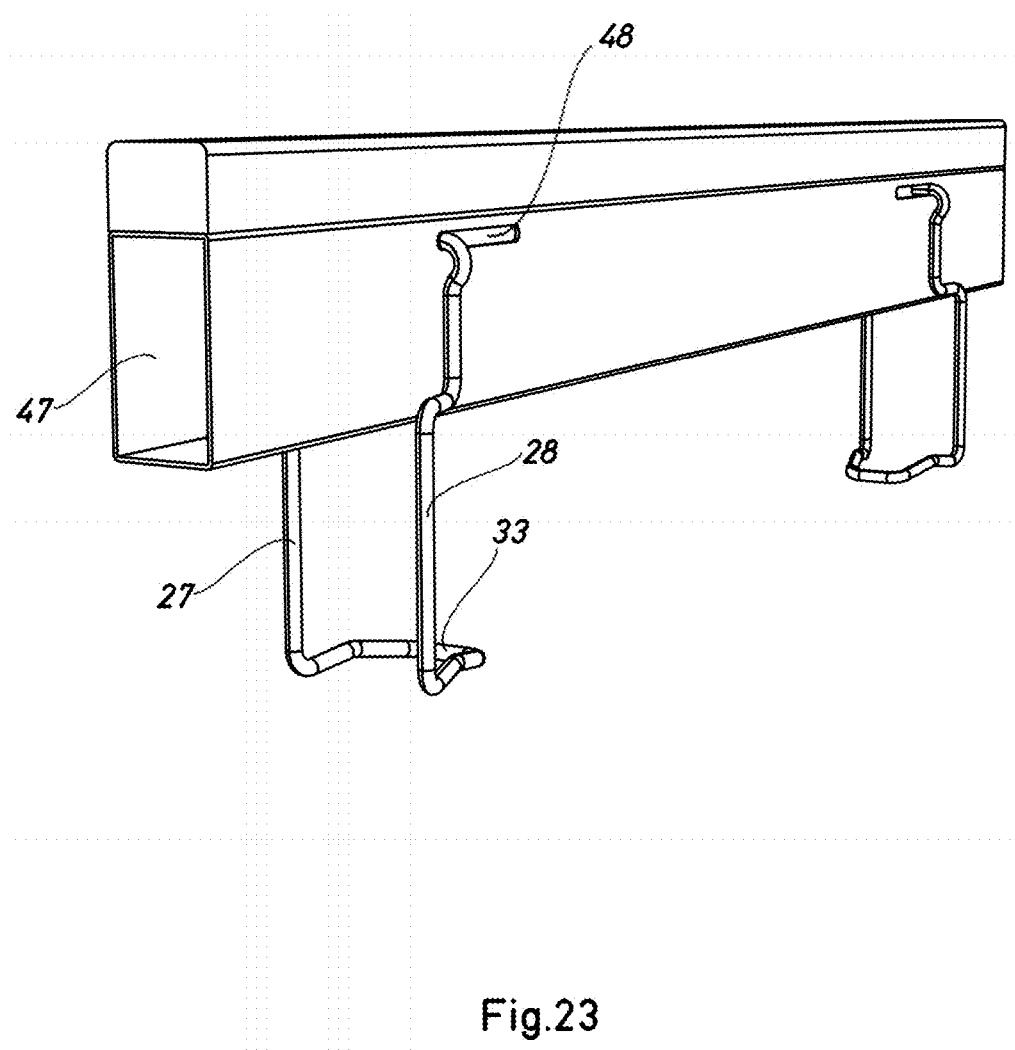
FIG. 23 is a perspective view of the device coupled into lateral slots in the metal portion of a combined beam.
Figure 24:
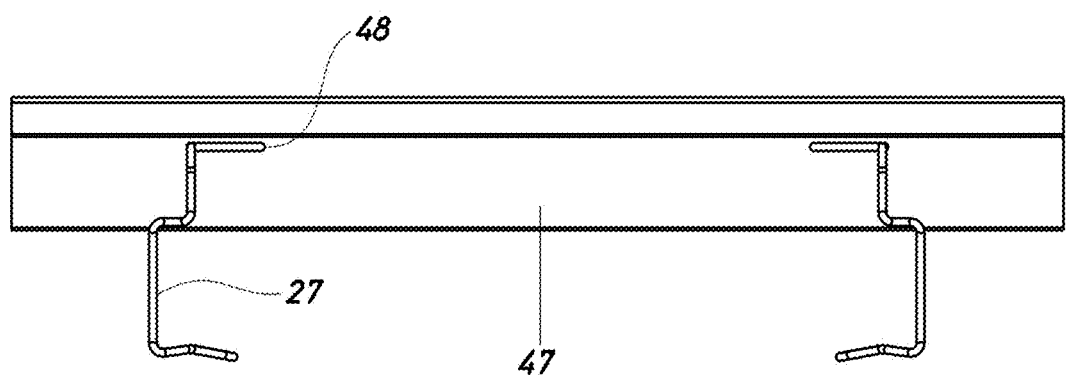
FIG. 24 is a side elevation view of a combined beam provided with two devices according to the variant indicated.
Figure 25:
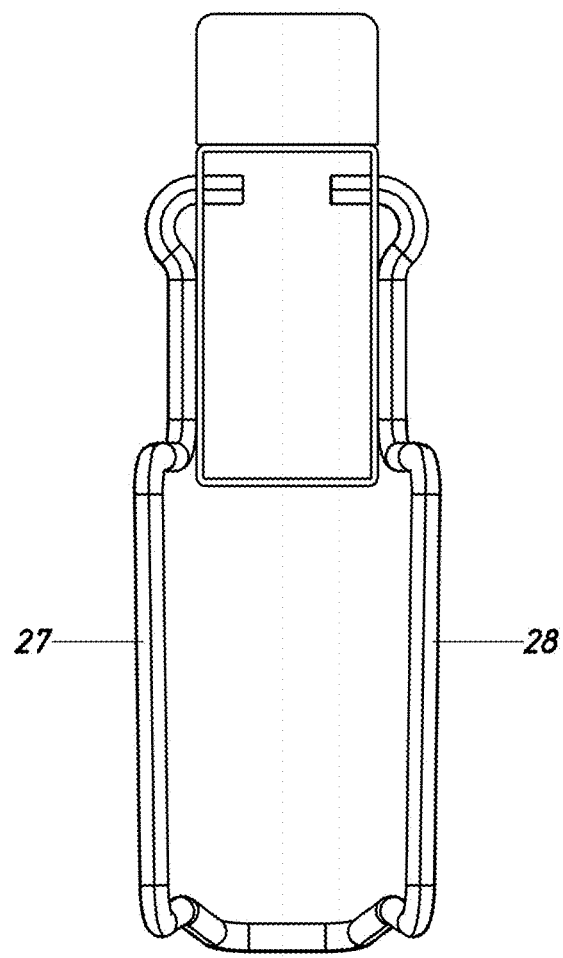
FIG. 25 is an elevation view of the variant device applied to a combined metal beam.

FIGS. 23 to 25 show the use of the device in a combined beam, the metal portion -47- of which has lateral slots -48- into which the ends of the device shown in FIGS. 17 to 20, i.e. the ends -38- and -39-, are inserted. The other components are located in a similar manner to the positioning version shown above.

FIG. 24 shows the arrangement of FIG. 23, in which two symmetrically shaped connecting devices are arranged on the metal portion -47- of the combined beam.

FIG. 25 shows the mounting of the device on the metal portion of a combined beam, which can be the one shown from FIG. 21 onwards, showing the positioning of the device with its arms -27- and -28- diverging slightly upwards.

Figure 26:
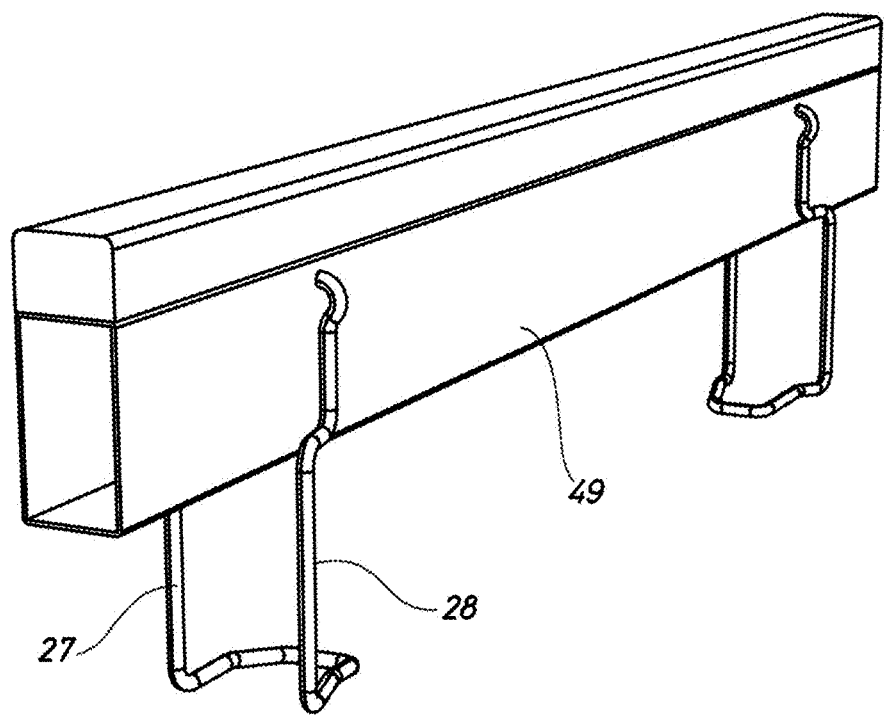
FIG. 26 is a perspective view showing the variant device applied to holes made in the metal portion of a combined beam.

FIG. 26 is a perspective view in which the devices of the variant explained are coupled to respective holes of the metal portion -49- of a combined beam.

Figure 27:
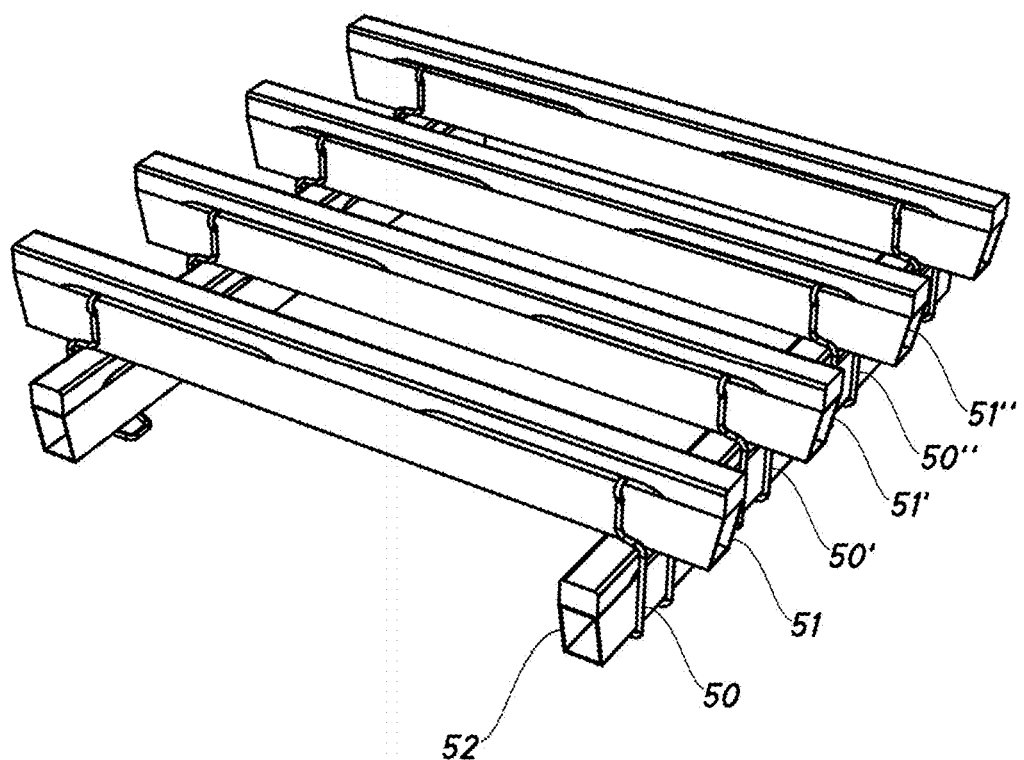
FIG. 27 is a perspective view from above of a series of intersecting formwork beams connected by means of the device of the variant version.
Figure 28:
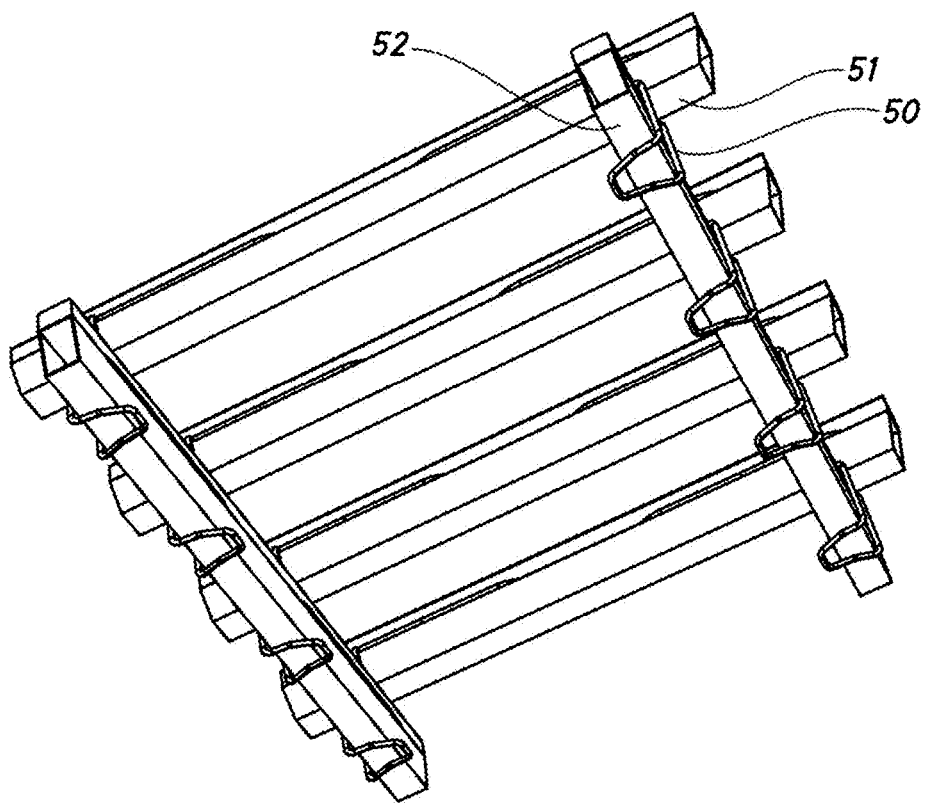
FIG. 28 is a perspective view from below of the arrangement shown in FIG. 27.

The mounting of the device on assemblies of beams can be seen in FIGS. 27 and 28, showing the mounting of multiple connection devices -50-, -50'-, -50"- between a lower combined beam -52- and multiple upper combined beams -51-, -51'-, -51"- as explained above.

FIGS. 29 to 36 show an additional embodiment of the device of the present invention and various examples of its use. Throughout said figures, components that are the same or equivalent have been identified with the same reference numerals.

Figure 29:
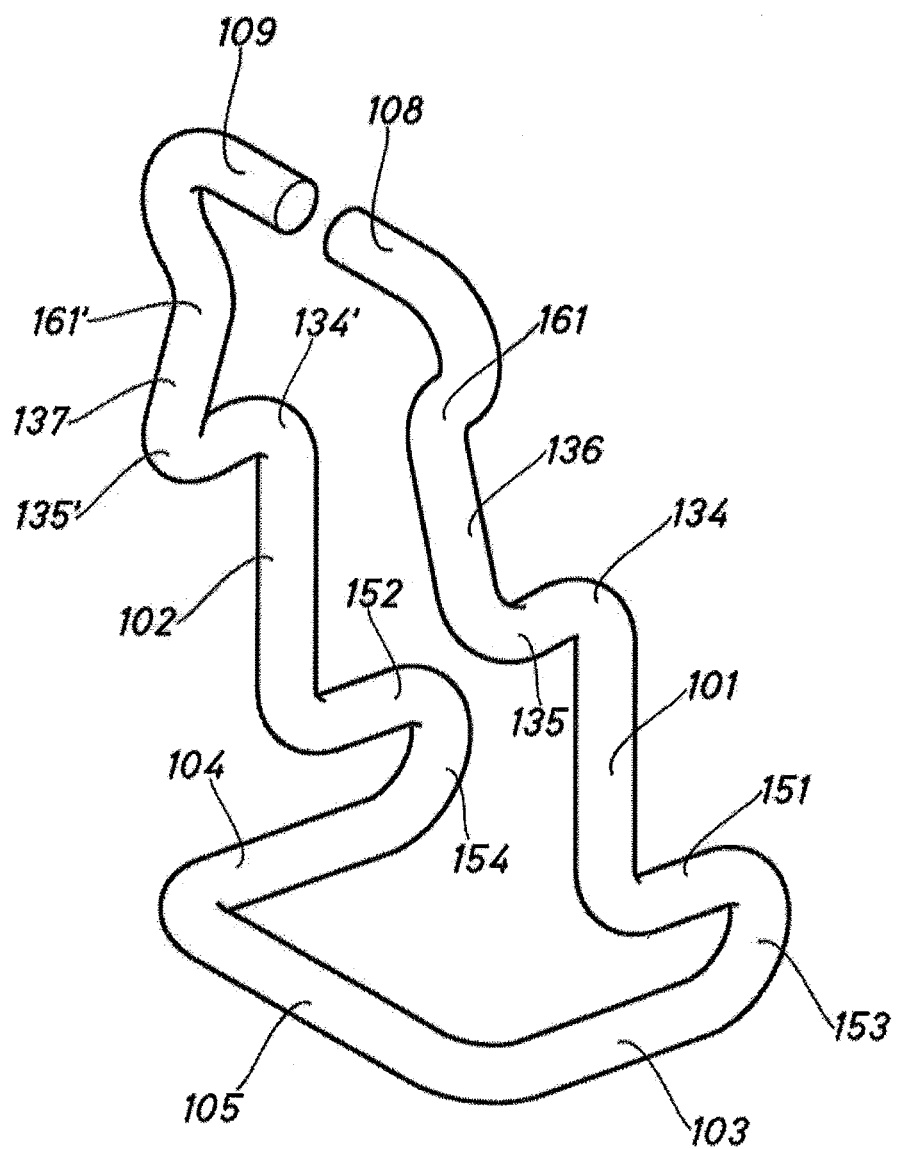
FIG. 29 is a perspective view of yet another embodiment of a device according to the present invention.
Figure 30:
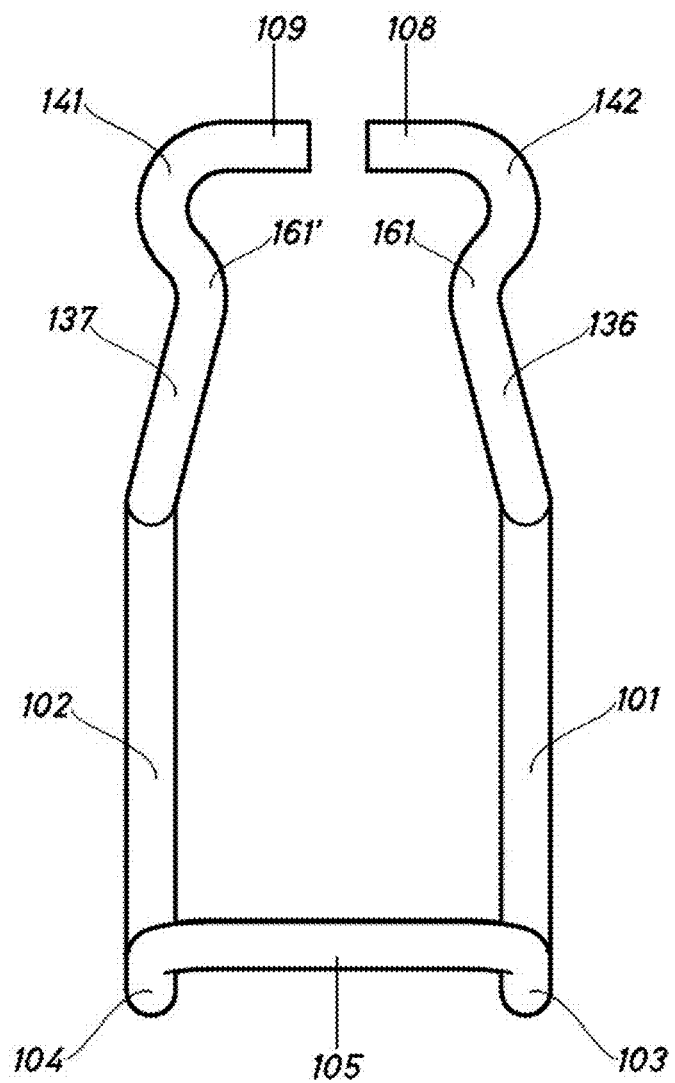
FIG. 30 is an elevation view of the embodiment in FIG. 29.
Figure 31:
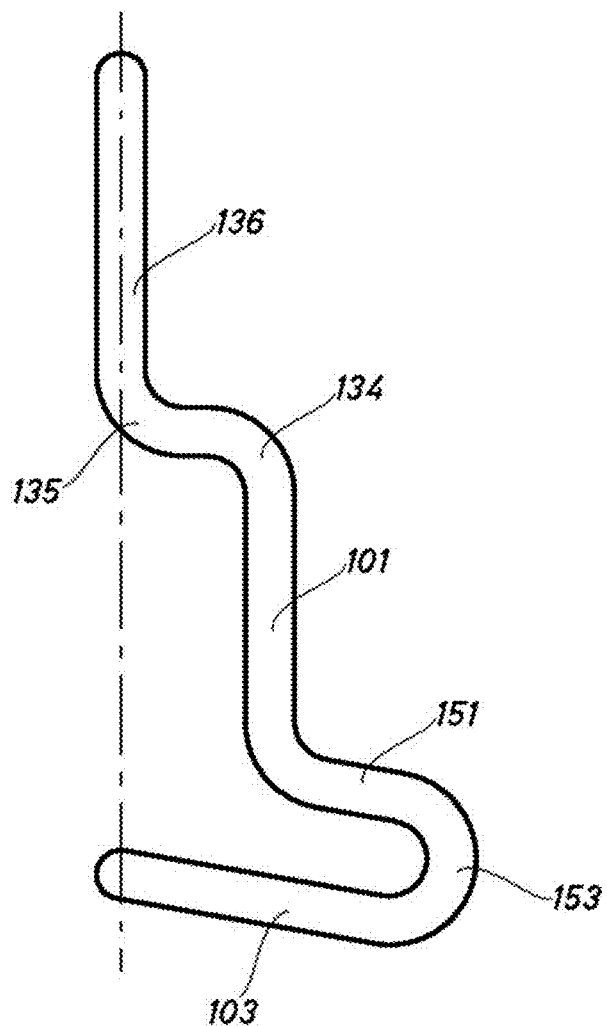
FIG. 31 is a side elevation view of the embodiment in FIGS. 29 and 30.
Figure 32:
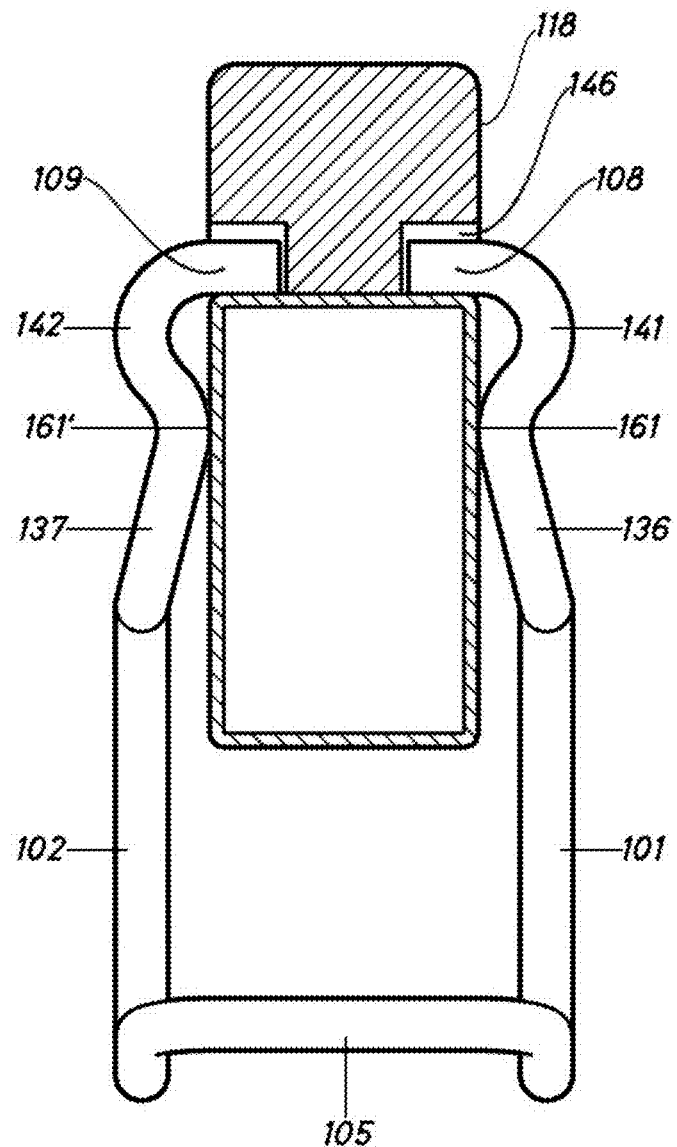
FIG. 32 is a schematic front view of the device in FIGS. 29 to 31 coupled to an upper beam, the lower beam not being shown.

The device shown in FIGS. 29 to 31 is a resilient device formed from a rod, for example a metal rod or the like, and also has two intermediate arms -101-, -102- that join respective regions intended to press on respective formwork beams to be connected.

As in the examples shown above, the final portion of the extensions at the end of the intermediate arms -101, -103-, or the end portions -108-, -109- of the device, are composed of respective coaxial straight sections. The coaxiality of the end portions -108-, -109- allows the device to tilt about the coaxial axis, allowing the device or part to be "parked" or "concealed" even at the outermost region of the beams -118- that bear them, thereby facilitating storage and transport.

The coaxial nature of the end portions -108-, -109- also has the effect of making it easier for the device to absorb angles between the upper beam -118- and the lower beam -117- that differ substantially from 90°, with a reduced risk of the device coming out (for example, one of the two end portions coming out of the groove -146-) and ceasing to act on one of the two beams.

The embodiment in FIGS. 29 to 31 also has buffers -161-, -161'- for resilient contact with the beam. These buffers are located close to the end portions -108-, -109- and on the inner face of the intermediate arms. In the example shown, the buffers -161-, -161'- are located at the end portion of the sections -136-, -137-, which constitute an almost vertical extension of the main section of the intermediate arms -101-, -102- after the double elbow -134-, -135-, -134'-, -135'-. The buffers -161-, -161'- of the example consist of respective elbows, although they could, for example, be a protuberance or a specific part. The buffers -161-, -161'- define the minimum distance between the intermediate arms. This is achieved because the sections -136-, -137- of the intermediate arms -101-, -102- form between them an angle of divergence, opening downwards in this case. As will be understood, for optimal use, the distance between buffers -161-, -161'- has to be less than the width of the bearing beam to which the device is joined, such that, once installed, said arms exert pressure on the flanks of the beam.

In this case, as can be observed clearly in FIG. 31, the buffers are coplanar with the plane defined by the axis of coaxiality of the end portions -108-, -109- and the lower region of the device supporting the lower beam (in this case, the crosspiece -105-).

Figure 33:
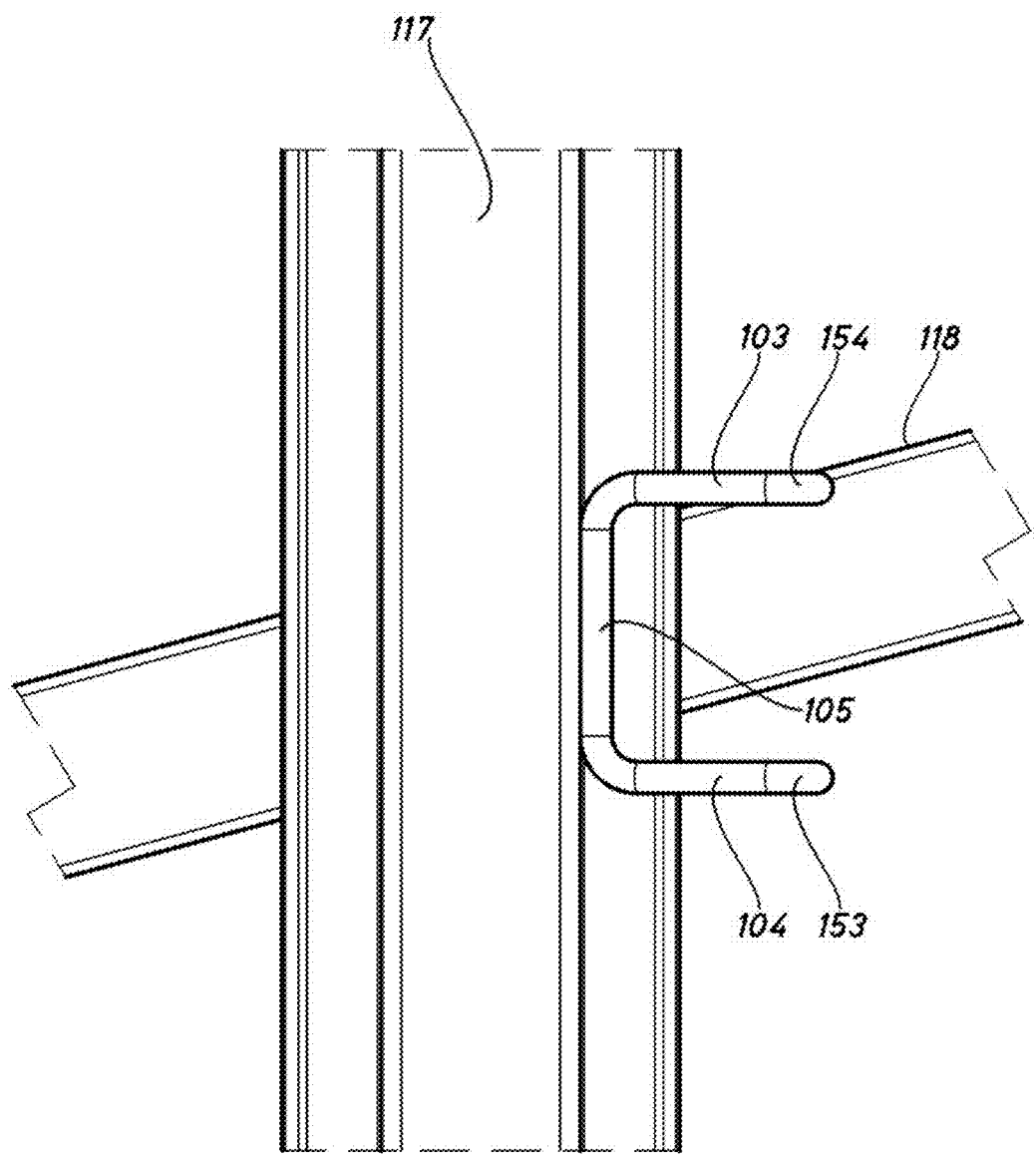
FIG. 33 is a plan view in which two beams can be seen positioned as a joint forming a specific angle other than 90°, using the device in FIG. 29.
Figure 34:
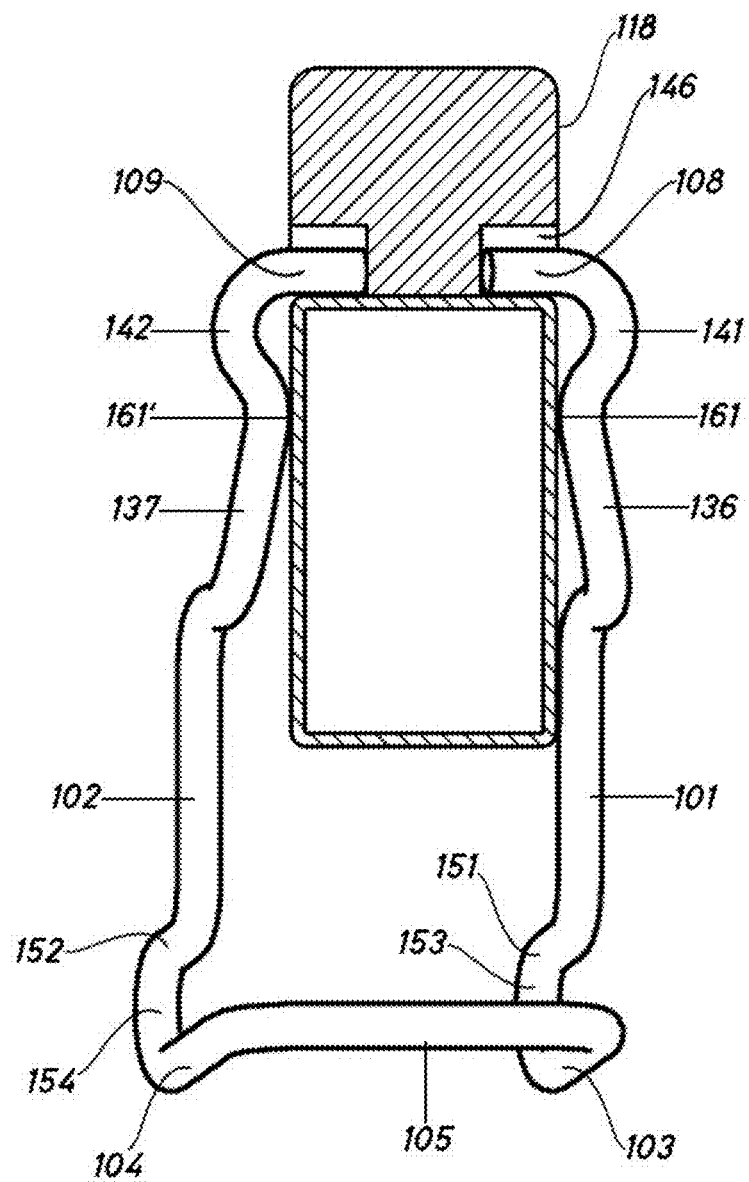
FIG. 34 is a schematic front view of the device coupled in the position in FIG. 33, in which, for reasons of clarity, the lower beam has not been shown.
Figure 35:
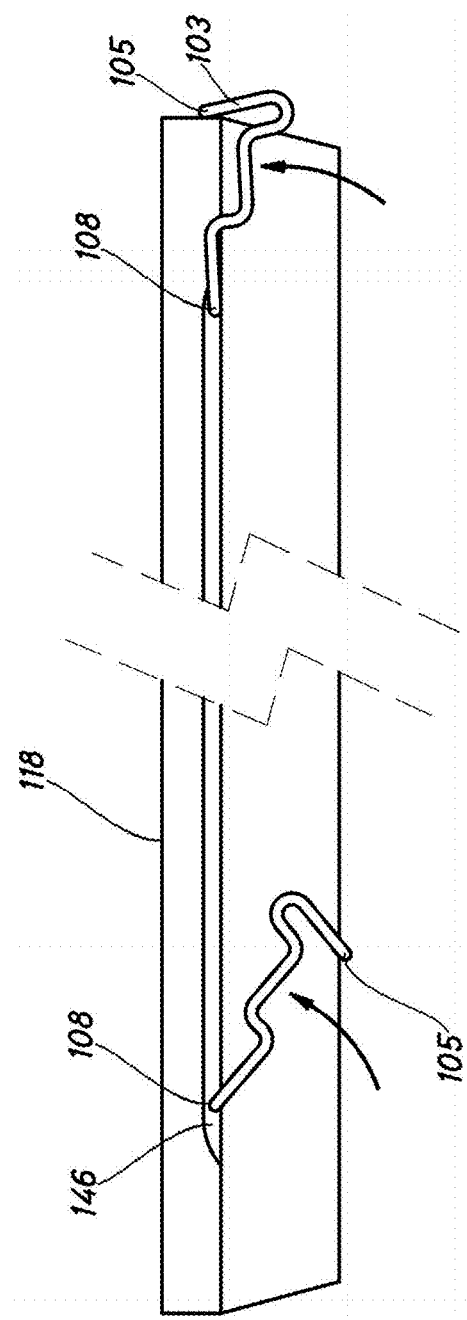
FIG. 35 is a perspective view of two devices similar to those in FIG. 29, in the position for transporting a beam.

By virtue of the aforementioned coplanarity, the device is able to provide a significant axis relative to an axis perpendicular to the contact surface between the two beams, fully maintaining the support of the end portions -108-, -109-, as can be observed in FIGS. 33 and 34. This provides the possibility of installing said device on beams that intersect at angles other than 90°, simultaneously maintaining the performance of the joint since the device rotates relative to the beam that carries it and fits perfectly on the lower beam, as it would on perpendicular beams (at 90°). This proves especially important when the lower beam -117- is supported via a flange -190- that is not very deep.

The greatest distance between the inner faces of the intermediate arms -101-, -102- is preferably greater than the width of the beam -118- bearing it (or upper beam). Two effects are thereby achieved. First of all, the region where the device contacts the lower beam -118- (in this case, the crosspiece -105-) is larger, providing greater stability against tipping of the beam -118- bearing it. Secondly, the device can thereby tilt easily at any point on the beam -118- that carries it until the central arm of the supporting U-shape (crosspiece -105-) comes into contact with the lower face of said beam -118-, being thereby protected from any impact it might suffer in the event of the beam falling to the ground.

Figure 36:
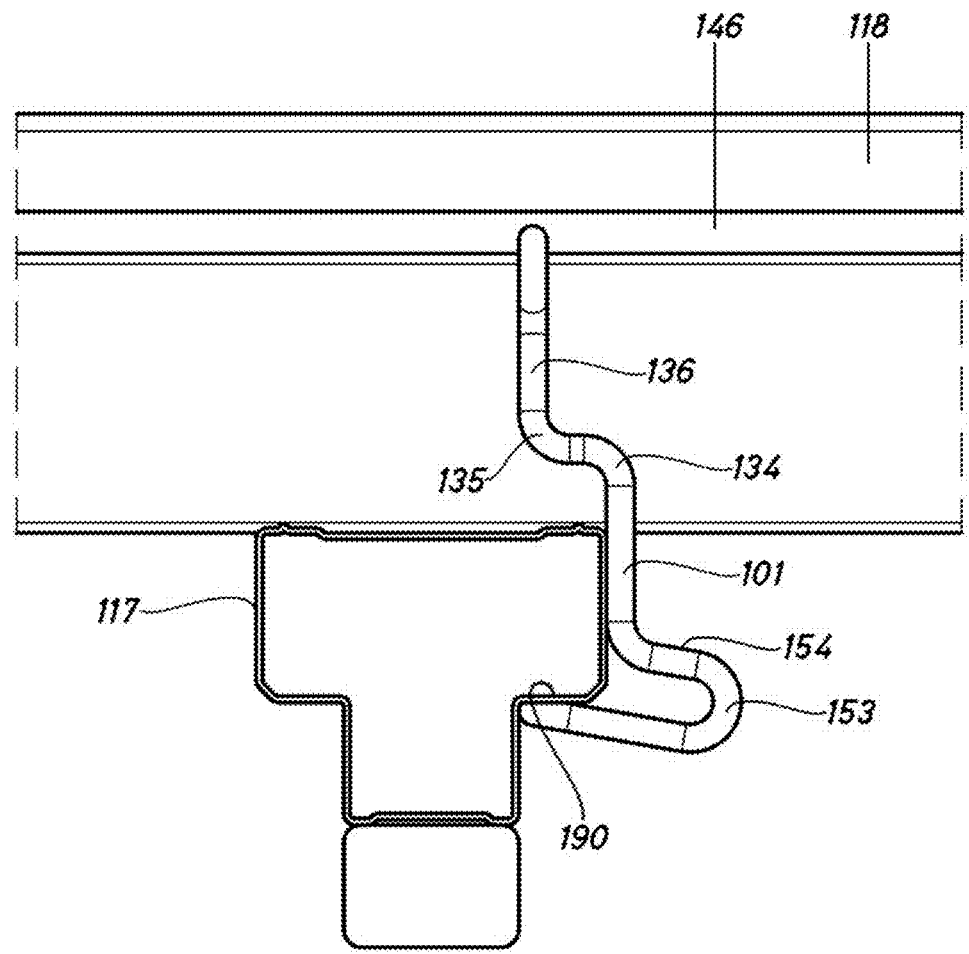
FIG. 36 is a side elevation view of a beam joint produced by means of the device in FIG. 29.

After the sections -136-, -137- and double elbows -134-, -135-, -134'-, -135'-, the main sections of the intermediate arms -101-, -102- preferably lie parallel to the side face of the lower beam -117- (see FIG. 36). More preferably, they will be in contact with said side face. This provides a region where the device can be struck and forced in when it contacts the lower beam -117-.

From this point onwards, the intermediate arms -101-, -102- are separated from the side face by respective distancing sections -151-, -152- until, by means of elbows -153-, -154-, they connect with the U- (or V-) shaped section that clasps the lower face of the flange -190- of the lower beam -117-. In this case, said U-shaped section is formed by the crosspiece -105- and the connecting sections -103-, -104-. On account of the separation provided by the distancing sections -151-, -142-, a region of greater resilience is produced, which facilitates the use of a smaller-diameter rod for the device and allows a tool to be used for separating the device from the lower beam -117-, for example by striking the region of greater resilience (for example, at one of the elbows -153-, -154-), which will cause the device to separate slightly from the beam due to a resilient reaction produced in response to the blow.

It will be observed that the device according to the present invention has features that are highly beneficial for its intended function in the construction industry. Indeed, as can be deduced from the above, the new device allows fast and economical manufacture, and when coupled to a joint of I-beams, whether wooden, metal or combined, brings great safety, given that the clamping it provides is independent of the position and force of mounting, but depends solely on the properties of the device itself. The device can be mounted very easily and quickly, being incorporated into one of the beams of the joint and travelling along the flanges thereof so as to be connected below the flange of the other beam forming the joint, coming into elastic deformation and thereby pressing one beam against the other. It also allows beams to be joined with a certain amount of variation in angle relative to the perpendicular.

It will be understood that the construction of the device according to the invention, shown in one example in the shape of a rod and in another example as a sheet component, could take on various structures while preserving the functional features according to the invention. Thus, for example, instead of rods, tubes or a combination of tube and rod can be used. Similarly, combined sheet/rod, or sheet/tube versions could be envisaged. Thus, for example, the upper straight extensions that extend from the vertical arms in the rod-based embodiment could be substituted by a flattened region made in the same straight extension or by welding on a sheet.

It should also be noted that although the examples show the devices for connecting the I-beams sliding over an upper beam of the two beams forming a joint, an opposite arrangement could also be envisaged, in which they slide over the lower beams while connected to the upper beams of the joint.

It should also be noted that the device according to the invention can, because of its specific properties, be easily recovered and applied later to other joints, since its properties do not in practice vary with use.

Notable, too, are the heightened safety features provided by the joint, ensuring a firm, stable connection of the two beams forming the joint and preventing the upper beam from tipping, for instance when personnel are moving around or in similar circumstances.

To successfully apply the device to the joint formed by two beams, taking advantage of the resilience of the material of the device, for example a steel sheet or rod, having spring-like resilient properties, the components intended to exert pressure initially form a small angle to the surfaces on which they have to press. Thus, for example, the lower U-shaped bridge forms a specific angle of convergence relative to the upper straight extensions, so that the correct amount of pressure is produced on the horizontal section of the lower bridge and the upper, straight extensions.

In the same way, a specific angle of divergence can be formed between the vertical arms of the device and the upper straight extensions in the plane that they define together with the elbows joining the vertical arms and the outermost prolongations of said extensions.

Given the features of the device according to the invention, the clamping force exerted on the flanges of the beams to be joined does not vary on account of the effect of any vibrations exerted on the assembly, as can happen in devices that include threaded parts with nuts or similar components or other mountings.

Although the invention has been described on the basis of representative examples, it should be understood that they are not restrictive and that the invention will be limited solely by the scope of the attached claims. Furthermore, it is clear that, after becoming aware of the present invention through its description, claims and drawings, persons skilled in the art will be able to introduce multiple modifications which, if they do not depart from the spirit of the invention, will be included in the scope thereof.

What is claimed is:

1. A connecting system for dismountably connecting two intersecting formwork beams comprising a resilient single-component structure joining together respective regions for pressing the two intersecting formwork beams together at support regions,
    wherein the resilient single-component structure is composed of a rod made of resilient material and comprises:
    two arms,
    horizontal sections,
    a crosspiece,
    horizontal extensions, and
    folded regions,
    wherein:
    the two arms are joined to respective said horizontal sections at a first end and extended into respective said horizontal extensions at a second end,
    free ends of each horizontal extension end with the folded regions,
    the horizontal extensions with the folded regions press on support regions of one of the two intersecting formwork beams being connected, while the crosspiece presses on the support region of the other one of the two intersecting formwork beams, and
    each folded region is disposed in a same plane defined by the horizontal extensions.

2. The connecting system according to claim 1, wherein the resilient single-component structure is configured to slide longitudinally over one of the two intersecting formwork beams until reaches the other one of the two intersecting formwork beams and, by applying pressure or impact on the resilient single-component structure, elastic deformation of the resilient single-component structure is produced so as to clamp or hold the two intersecting formwork beams and press them together.

3. The connecting system according to claim 1, wherein each of the arms form an angle smaller than 90° with respect to the respective horizontal sections.

4. The connecting system according to claim 1, wherein the horizontal sections and the crosspiece form a U- or V-shaped bridge for pressing on the support region of the other one of the two intersecting formwork beams.

5. The connecting system according to claim 4, wherein the U- or V-shaped bridge is a planar U-shaped bridge.

6. The connecting system according to claim 1, wherein the resilient single-component structure further comprises elbow sections.

7. The connecting system according to claim 1, wherein the two intersecting formwork beams are I-beams and support regions are formed by an upper or lower flanges of the I-beams.

8. The connecting system according to claim 1, wherein the material of the resilient single-component structure is steel.

9. The connecting system according to claim 6, wherein the material of the resilient single-component structure is a steel that has highly resilient properties.

10. The connecting system according to claim 1, wherein the material of the resilient single-component structure is a synthetic material, a plastic material or a composite.

11. The connecting system according to claim 1, wherein compression force for simultaneously clamping the two intersecting formwork beams to be joined is independent of the positioning in terms of angle or depth of a device relative to the two intersecting formwork beams to be joined.

12. The connecting system according to claim 1, wherein compression force for simultaneously clamping the two intersecting formwork beams to be joined is independent of the force for positioning said resilient single-component structure once positioned on the two intersecting formwork beams to be joined.

13. The connecting system according to claim 1, wherein two intersecting formwork beams can be forming a specific angle other than 90°.

14. A connecting system for dismountably connecting two intersecting formwork beams comprising a resilient single-component structure joining together respective regions for pressing the two intersecting formwork beams together at support regions, wherein the resilient single-component structure is composed of a rod made of resilient material and comprises:

two arms,
horizontal sections,
a crosspiece,
horizontal extensions, and
folded regions,
wherein:
the two arms are joined to respective said horizontal sections at a first end and extended into respective said horizontal extensions at a second end, and
free ends of each horizontal extension end with the folded regions,
the horizontal extensions with the folded regions press on support regions of one of the two intersecting formwork beams being connected, while the crosspiece presses on the support region of the other one of the two intersecting formwork beams,
each folded region is disposed in a same plane defined by the horizontal extensions, and
a longitudinal direction of the crosspiece is parallel with the plane defined by the horizontal extensions.

* * * * *